United States Patent
Mao et al.

(10) Patent No.: US 7,031,060 B2
(45) Date of Patent: Apr. 18, 2006

(54) NON-MOVING PARTS ADD/DROP DEVICE

(75) Inventors: Hongwei Mao, San Jose, CA (US); Kok Wai Chang, Los Altos, CA (US); Yi-Xin Chen, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 1061 days.

(21) Appl. No.: 09/764,256

(22) Filed: Jan. 19, 2001

(65) Prior Publication Data

US 2002/0097466 A1   Jul. 25, 2002

(51) Int. Cl.
  G02B 27/28   (2006.01)
  G02B 5/30   (2006.01)

(52) U.S. Cl. .................. 359/494; 359/496; 359/497; 385/11; 385/24; 398/83; 398/86

(58) Field of Classification Search .............. 385/11, 385/24, 16; 359/494–498, 485; 398/85, 398/86, 83
See application file for complete search history.

(56) References Cited

U.S. PATENT DOCUMENTS

| 4,973,124 | A | | 11/1990 | Kaede ................ 350/96.15 |
|---|---|---|---|---|
| 5,223,975 | A | * | 6/1993 | Naganuma et al. ......... 359/487 |
| 5,381,250 | A | * | 1/1995 | Meadows .................. 349/196 |
| 5,606,439 | A | | 2/1997 | Wu ............................. 349/117 |
| 5,694,233 | A | | 12/1997 | Wu et al. ................... 359/117 |
| 5,978,116 | A | | 11/1999 | Wu et al. ................... 359/124 |
| 6,035,080 | A | | 3/2000 | Henry et al. ................. 385/24 |
| 6,687,423 | B1 | * | 2/2004 | Yao .............................. 385/11 |
| 6,920,258 | B1 | * | 7/2005 | Tai ............................... 385/16 |

\* cited by examiner

*Primary Examiner*—Leonidas Boutsikaris
(74) *Attorney, Agent, or Firm*—Lacasse & Associates LLC; Randy W. Lacasse

(57) ABSTRACT

The instant invention provides an add/drop device including a wavelength filter, a quarter waveplate disposed on either side of the wavelength filter, and a polarizing beamsplitter disposed on either side of the quarter waveplates. Each polarizing beamsplitter has an input port and an output port for launching and receiving a beam of light having a known polarization. A polarization switch is optically coupled to each input/output port for selectably rotating the polarization of the input/output beams of light. Advantageously, the polarization switches, which work in cooperation with each other and the polarizing beam splitters, provide means for a non-moving parts add/drop device.

21 Claims, 23 Drawing Sheets

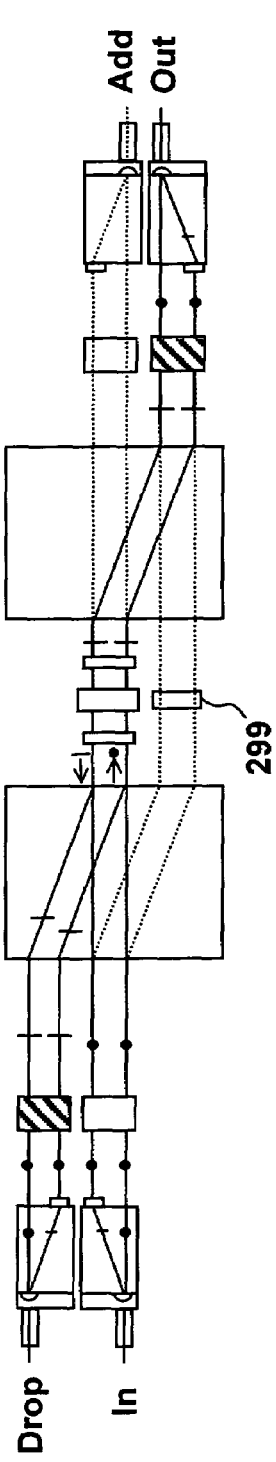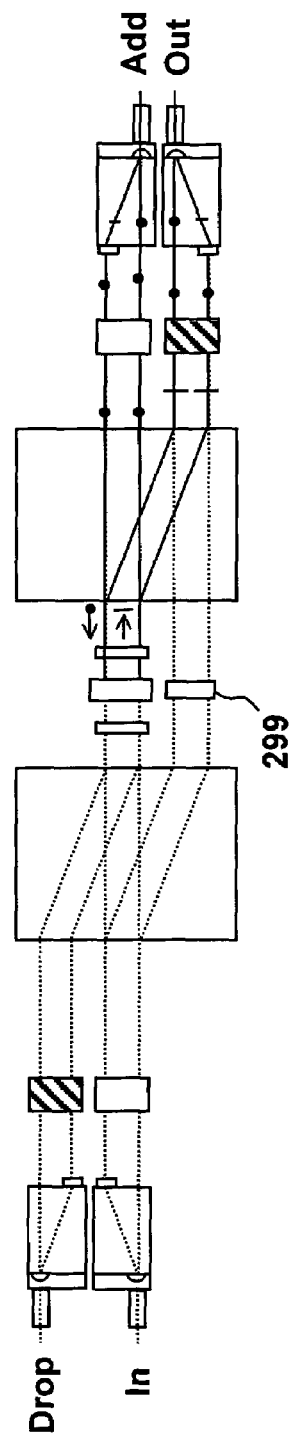
FIG. 8C
FIG. 8D

NON-MOVING PARTS ADD/DROP DEVICE

FIELD OF THE INVENTION

This invention relates generally to add/drop devices and more specifically to add/drop devices using a polarisation switch as the switching mechanism.

BACKGROUND OF THE INVENTION

Add-drop multiplexers are used, for instance, in nodes of a wavelength division multiplexing communication network, to extract a channel from the multiplexed stream, letting the remaining channels pass through unaltered, and to add a new channel to the multiplexed stream. In practice, it is advantageous that the dropped channel and the added channel are allocated the same wavelength position to simplify network management.

Typically, add-drop multiplexers are four-port devices, with two ports for the input/output of the multiplexed stream and two ports for the input/output of the individual channel. For convenience, the input and output ports for the multiplexed stream are referred to as the express input and output ports, respectively, and the input and output ports for the new and extracted channels are referred to as the "add" and the "drop" ports, respectively.

Conventionally, prior art add-drop multiplexers have used fixed or tunable filters to provide the necessary wavelength selectivity for the add/drop function, e.g., fibre Bragg gratings, non-absorbing interference filters, etc. Typically, when these prior art systems are configurable between express passthrough modes of operation and add/drop modes of operation, the design relies upon physical movement of the filter in and out of the optical path.

In U.S. Pat. Nos. 5,606,439 and 5,694,233, Kuang-Yi Wu discloses an add/drop optical filter including a plurality of birefringent elements and Faraday rotator for switching channels of a multiplexed beam of light between first and second output ports. However, neither of these patents teaches a four port add/drop device that is configurable between express passthrough modes of operation and add/drop modes of operation.

It is an object of this invention to provide an add/drop multiplexer that offers configurabilty between passthrough and add/drop states with non-moving parts.

It is another object of this invention to provide a configurable four port add/drop device that uses a controllable polarisation switch as the switching mechanism.

SUMMARY OF THE INVENTION

The instant invention provides an add/drop device including a wavelength filter, a quarter waveplate disposed on either side of the wavelength filter, and a polarising beamsplitter disposed on either side of the quarter waveplates. Each polarising beamsplitter has an input port and an output port for launching and receiving a beam of light having a known polarisation. A polarisation switch is optically coupled to each input/output port for selectably rotating the polarisation of the input/output beams of light. Advantageously, the polarisaton switches, which work in cooperation with each other and the polarising beam splitters, provide means for a non-moving parts add/drop device.

In accordance with the instant invention there is provided an add/drop device comprising: first and second optically coupled polarising beamsplitters; a wavelength filter disposed between the first and second polarisation beams splitters; first and second polarisation rotators disposed between the filter and the first polarising beamsplitter and the filter and the second polarising beamsplitter, respectively; first and second input ports optically coupled to the first and second polarising beamsplitters, respectively, each of the first and second input ports for launching a beam of light having a predetermined polarisation; first and second output ports optically coupled to the first and second polarising beamsplitters, respectively; and first and second polarisation switches optically coupled to the first input port and one of the first and second output ports, respectively, each of the first and second switches for selectably rotating the polarisation of a beam of light launched therethrough and configured to work in cooperation with the other.

In accordance with the instant invention there is provided an add/drop multiplexer comprising:a first and a second polarising beamsplitter; a wavelength filter disposed between the first and second polarisation beams splitters; a polarisation rotator disposed between each polarising beamsplitter and the filter; an input port for launching a multiplexed beam of light having a predetermined polarisation into the first polarising beamsplitter; a first polarisation switch disposed between the input port and the first polarising beamsplitter for selectably rotating the polarisation of the multiplexed beam of light, the first polarisation switch operable in a first mode of operation wherein the polarisation is switched such that the first polarising beamsplitter directs the multiplexed beam of light away from the filter to an output port optically coupled to one of the first and second polarising beamsplitters, and a second mode of operation wherein the polarisation is switched such that the first polarising beamsplitter directs the multiplexed beam of light towards the filter where a portion of the beam of light is directed to a drop port optically coupled to the other of the first and second polarising beamsplitters and a remaining portion is directed to the output port; an add port for launching an add beam of light having a predetermined polarisation into the second polarising beamsplitter such that it is directed to the output port having a same polarisation as the remaining portion; and, a second polarisation switch optically coupled to the output port for working in cooperation with the first polarisation switch to selectably rotate the polarisation of one of the multiplexed beam of light and a composite beam of light including the remaining portion and the add beam of light.

In accordance with the instant invention there is provided in a four-port add/drop optical system comprising an input port and an output port for transmitting and receiving a multiplexed beam of light, respectively, an add port and a drop port for transmitting an added and dropped beam of light, respectively, a first and a second polarising beamsplitter, a wavelength filter disposed between the first and second polarisation beams splitters, a polarisation rotator disposed between each polarising beamsplitter and the wavelength filter, and a first and a second polarisation switch optically coupled to the input port and the output port, respectively, a method comprising the steps of:launching a first beam of light having a known polarisation from the input port to the first polarising beamsplitter; operating the first polarisation switch in a first mode of operation such that the first polarising beamsplitter directs the first beam of light away from the wavelength filter to the output port; operating the first polarisation switch in a second mode of operation such that the first polarising beamsplitter directs the first beam of light to the wavelength filter, where a first portion is directed to the drop port and a second portion is directed to the output port; launching a second beam of light having a known polarisation from the add port to the second polarising beamsplitter; operating the second polarisation switch in one of the first and second modes of operation synchronously with the first polarisation switch.

BRIEF DESCRIPTION OF THE DRAWINGS

Exemplary embodiments of the invention will now be described in conjunction with the drawings in which:

FIG. 1 is a schematic illustration of an add/drop device in accordance with one embodiment of the invention;

FIGS. 6a and 6b illustrate the express pass through mode of operation, and FIGS. 6c and 6d illustrate the add/drop mode of operation;

FIGS. 8c and 8d are schematic illustrations showing the add/drop mode of operation of the add/drop device shown in FIGS. 8a and 8b.

DETAILED DESCRIPTION OF THE INVENTION

Figure 1A:
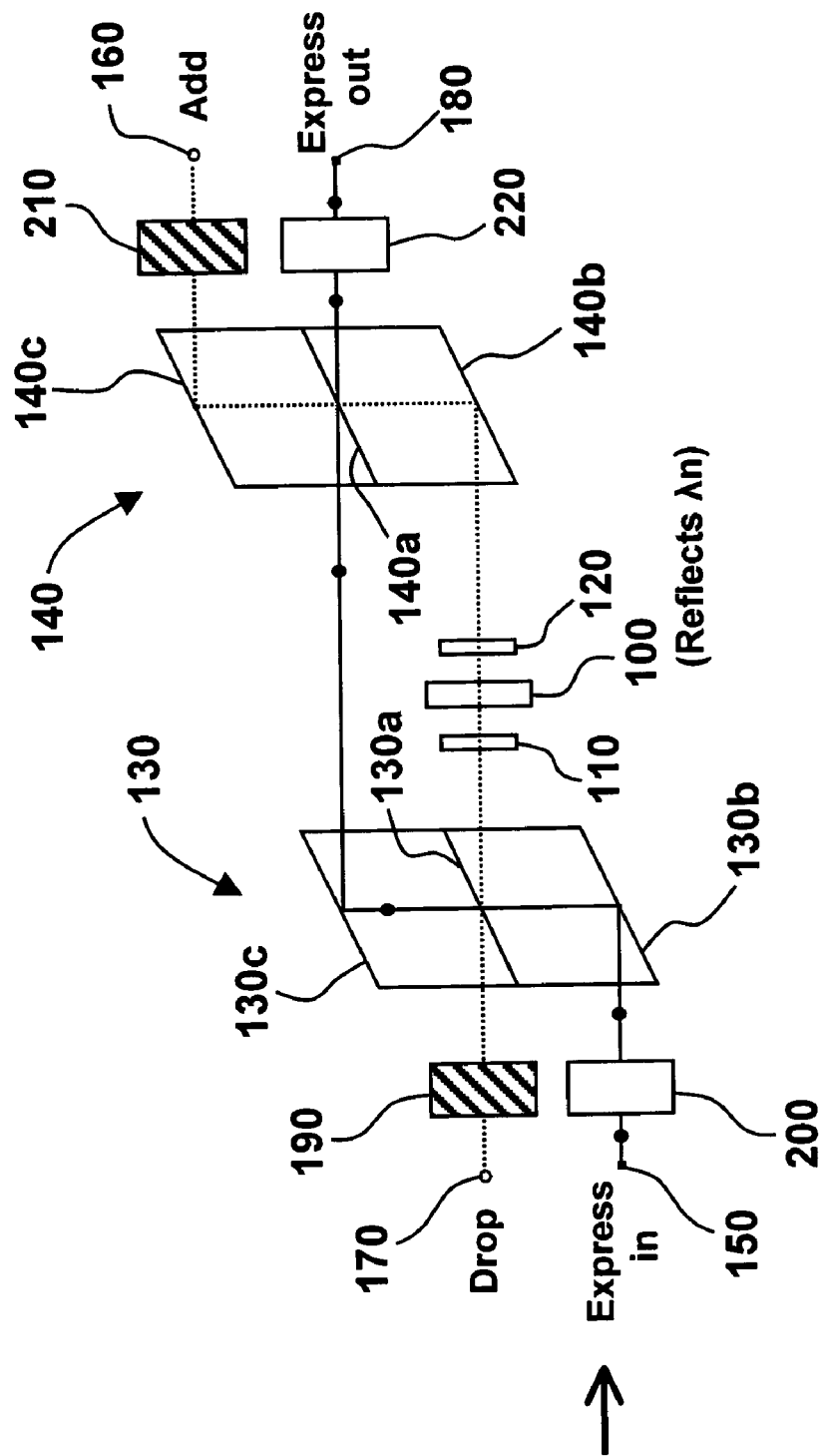
FIGS. 1a and 1b illustrate the express passthrough mode of operation for the device shown in FIG. 1.

Referring to FIG. 1 there is shown an add/drop device in accordance with the instant invention. The add/drop device 10 includes a wavelength filter 100 sandwiched between first 110 and second 120 polarisation rotators. First 130 and second 140 polarising beamsplitters are optically coupled to first 110 and second 120 polarisation rotators, respectively. Each beamsplitter 130,140 is optically coupled to an input port 150,160, and an output port 170,180, respectively. A polarisation switch 190,200,210,220 is disposed between each input 150,160 and output 170,180 port and the corresponding polarising beamsplitter 130,140 to which they are coupled. The polarisation switches 190,200,210,220 are configured substantially synchronously such that they work in cooperation with each other.

Preferably, the polarisation switch is a device that is capable of selectably rotating the polarisation of a beam of light passing therethrough between two control states (e.g., ON and OFF) as a function of applied electric/magnetic field. Suitable devices for this non-moving parts switch, include for example, twisted nematic liquid crystal rotators, ferroelectric liquid crystal rotators, pi-cell based liquid crystal rotators, magneto-optic based Faraday rotators, and acousto-optic or electro-optic based polarisation rotators. Alternatively, a mechanism for mechanically inserting and removing a half-waveplate is provided. In a preferred embodiment, the polarisation switches are ±45° latching Garnets. Notably, the terms "ON" and "OFF" states do not necessarily correspond directly to the application or removal of an applied electric/magnetic field, but rather to the instance wherein the polarisation of the beam of light passing therethrough is rotated by 90°, and an instance wherein the polarisation of the beam of light passing therethrough is not rotated, respectively.

Preferably, the polarising beamsplitters are any one of the conventional polarising beamsplitters having an interface 130a between two cemented anisotropic (uniaxial) crystal blocks 130b, 130c having different orientations. Similarly, it is preferred that the polarisation rotators are quarter waveplates or other reciprocal rotators having an orientation and/or capability for providing 45° polarisation rotation in a single pass and 90° in a double pass through the same rotator.

In the embodiment shown in FIG. 1, the filter is a wavelength selective element for reflecting a predetermined wavelength and passing a plurality of other wavelengths (e.g., a notch filter), and the polarisation rotators 110 and 120, are quarter waveplates having their optical axes aligned at 90° to one another such that a beam of light having a predetermined polarisation passes sequentially therethrough to emerge with the same predetermined polarisation. Typically, the polarisation switches 190,200,210,220 are configured such that two of the switches are in an "ON" state, while the other two are in an "OFF" state.

Referring to FIGS. 1a–1d, the operation of the add/drop device 10 will be described. For exemplary purposes, a beam of light having a horizontal polarisation is depicted with the symbol "•", and a beam of light having a vertical polarisation is depicted with the symbol "l", as though viewed from the side. Similarly, a polarisation switch 190, 200,210,220 in an "ON" state wherein the polarisation of a beam of light passing therethrough is rotated by 90° is illustrated with a solid box, and a polarisation switch 190, 200,210,220 in an "OFF" state wherein the polarisation of a beam of light passing therethrough is not affected is illustrated with an unfilled box. For exemplary purposes, the polarising beamsplitters are shown to pass light having a horizontal "•" polarisation, and reflect light having a vertical "l" polarisation. However, the polarising beamsplitters are optionally designed to pass light having a vertical "l" polarisation, and reflect light having a horizontal "•"polarisation, in dependence upon the type of polarising prism.

Figure 1B:
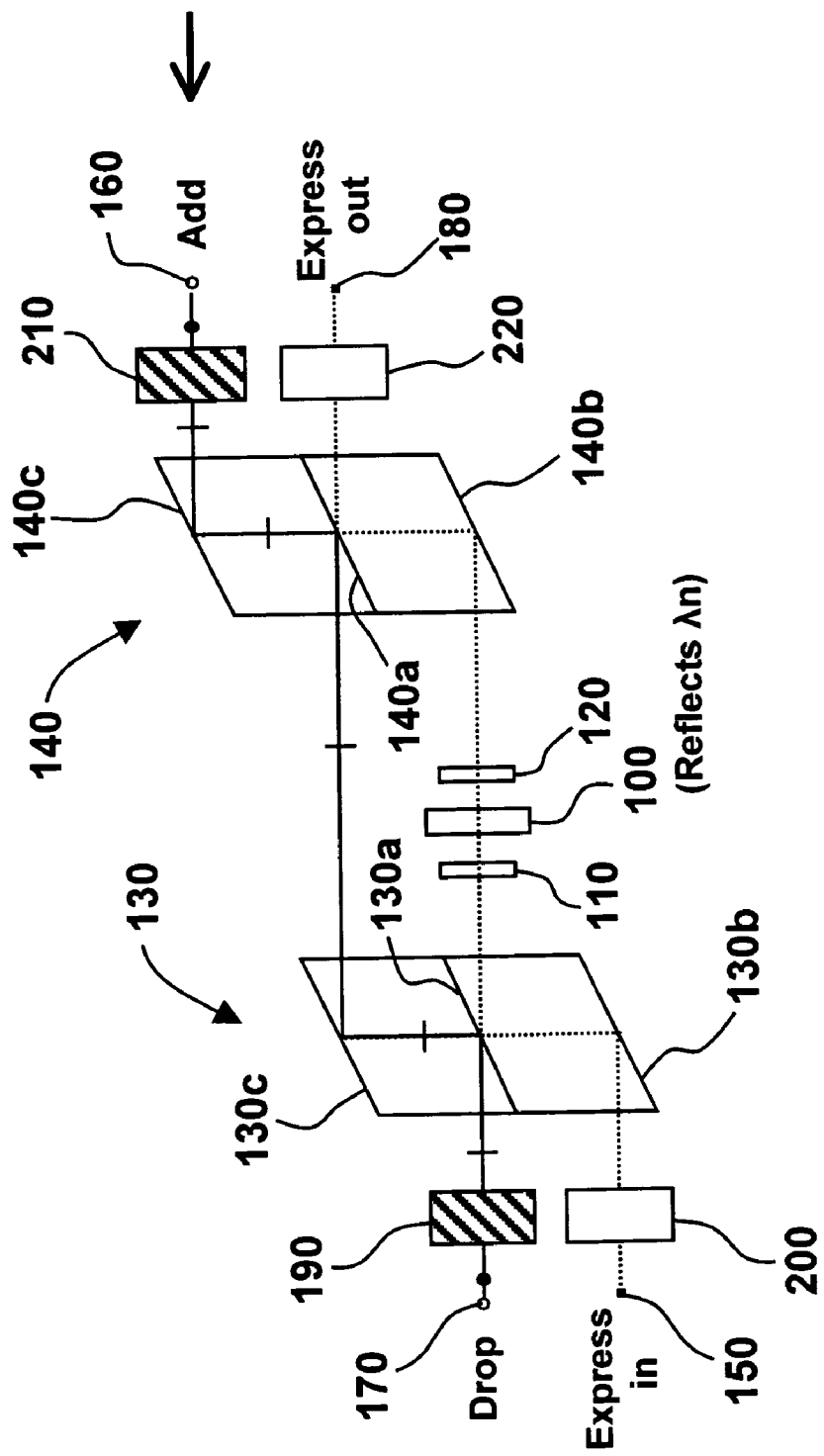

FIGS. 1a and 1b illustrate the express passthrough mode of operation. Referring to FIG. 1a, a beam of light having a predetermined polarisation, "•", is launched from the input port 150 to the first polarisation switch 200, which is in an "OFF" state. Since the polarisation is not affected the beam of light reflects off an inner surface of anisotropic block 130b, passes through the interface 130a, and is reflected off an inner surface of anisotropic block 130c to the second polarising beamsplitter 140, thus avoiding the wavelength filter 100. The beam of light passes through the interface 140a and is transmitted through the second polarisation switch 220, which is also in an "OFF" state. Accordingly, the beam of lights exits through output port 180 having the same predetermined polarisation, "•", as launched into port 150.

Referring to FIG. 1b, a second beam of light having a predetermined polarisation, "•", is simultaneously launched from the add port 160 to a third polarisation switch 210, which is in an "ON" state. The polarisation of the second beam of light is rotated by 90° by the polarisation switch 210. Accordingly, the second beam of light reflects off an inner surface of anisotropic block 140c, reflects off interface 140a, and is transmitted to the first polarising beamsplitter 130, thus avoiding the wavelength filter 100. The second beam of light is reflected off of the inner surface of anisotropic block 130c, is reflected off splitting interface 130a, and is transmitted through the forth polarisation switch 190, which is also in an "ON" state. The beam of lights exits through drop port 170 having the same predetermined polarisation, "•", as launched into port 150. Notably, the add/drop device of the instant embodiment has a 2×2 configuration wherein the express optical signal is directed to the output port and the add signal is directed to a drop port in the express passthrough mode of operation illustrated in FIGS. 1a and 1b.

Figure 1C:
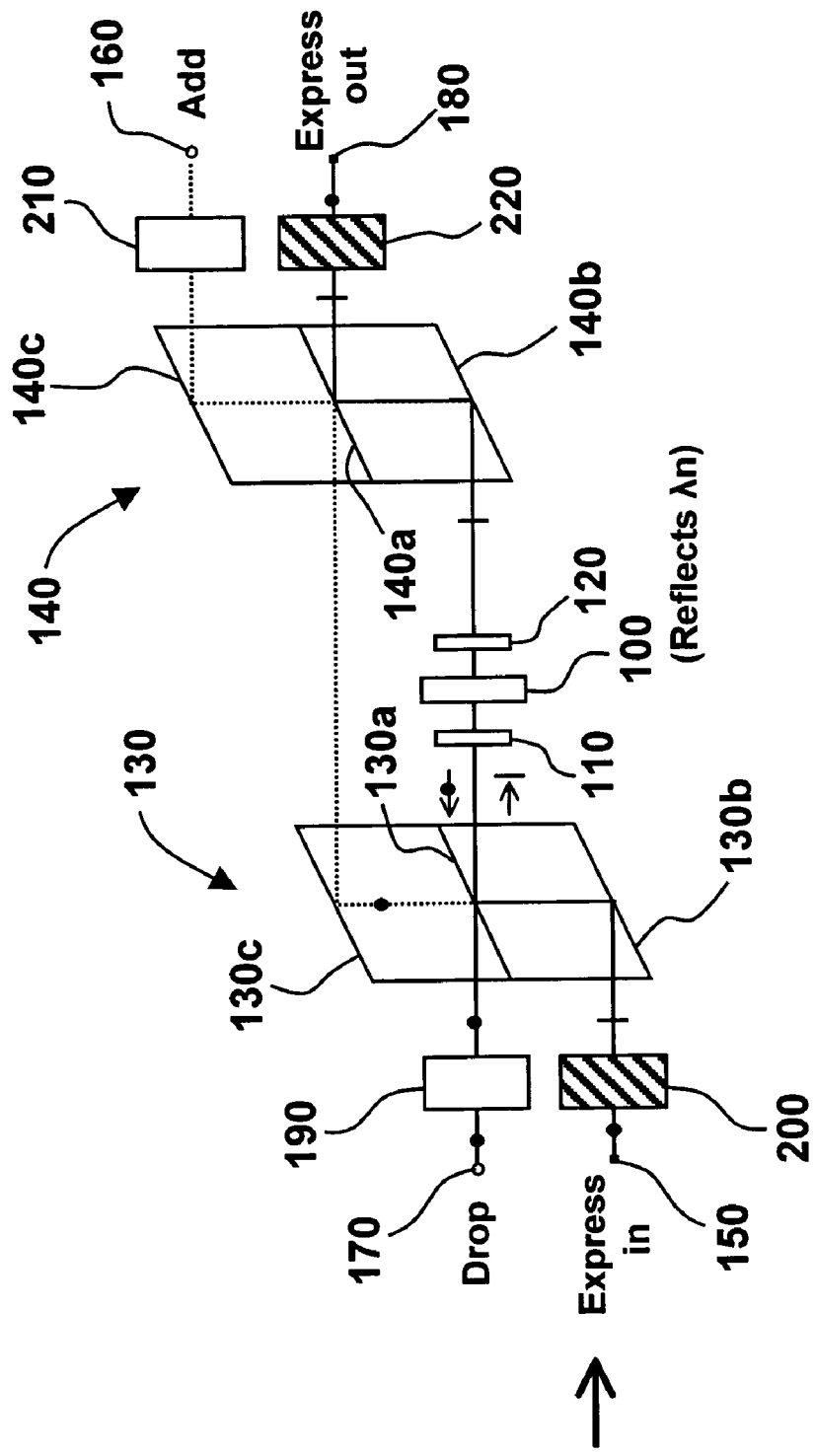
FIGS. 1c and 1d illustrate the add/drop mode of operation for the device shown in FIG. 1.
Figure 1D:
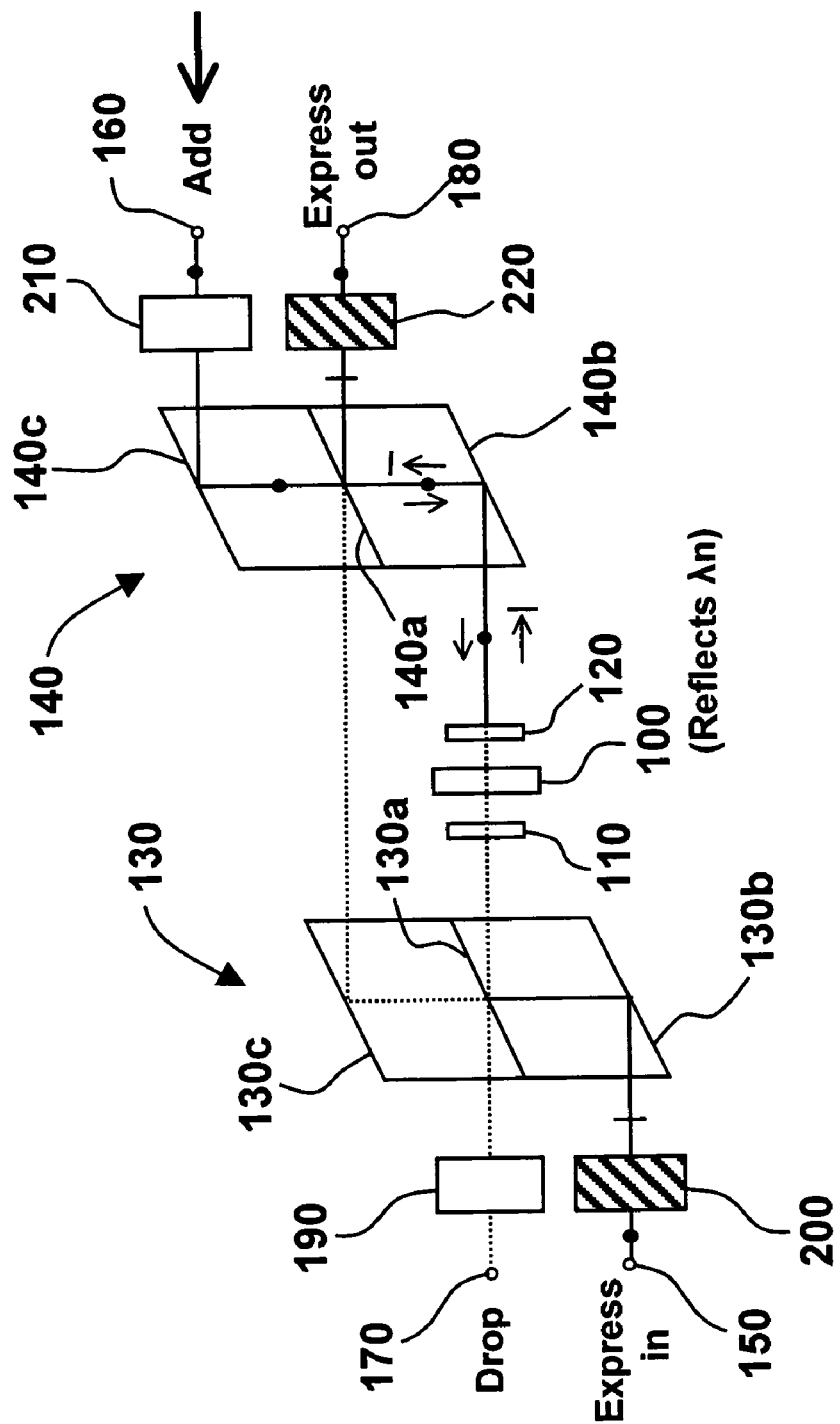

FIGS. 1c and 1d illustrate the add/drop mode of operation. Referring to FIG. 1c, a beam of light having a predetermined polarisation, "•", is launched from the input port 150 to the first polarisation switch 200, which is in an "ON" state. Since the polarisation of the beam of light is rotated by 90° (i.e., to "|") by the polarisation switch 200, it reflects off an inner surface of anisotropic block 130b, reflects off interface 130a, and is directed to the second polarising beamsplitter 140 via the wavelength filter 100 and quarter waveplates 110 and 120. More specifically, the beam of light is transmitted through the first quarter waveplate 110, wherein the light become circularly polarised, and is transmitted to the wavelength filter 100, which reflects a predetermined wavelength and passes a plurality of other wavelengths. The light corresponding to the predetermined wavelength is reflected back through the first quarter waveplate 110 having its polarisation rotated a total of 90° (i.e., to "•"), where it is directed through the polarising beamsplitter 130 to the fourth polarisation switch 190 in an "OFF" state to the drop port 170. The light corresponding to the plurality of other wavelengths is transmitted through the wavelength filter 100 and second quarter waveplate 120. Since the quarter waveplates 110 and 120 have their optical axes aligned at 90° to one another, the beam of light is incident on the second polarising beamsplitter 140 with a vertical polarisation "|". Accordingly, the transmitted beam of light corresponding to the plurality of other wavelengths is reflected off inner surface 140b, is reflected off interface 140a, is passed through the second polarisation switch 220, which is in an "ON" state, and exits through output port 180 having the predetermined polarisation, "•".

Referring to FIG. 1d, a second beam of light having a predetermined polarisation, "•" and including the predetermined wavelength is simultaneously launched from the add port 160 to the third polarisation switch 210, which is in an "OFF" state. Since the polarisation is not affected by the polarisation switch 210, the beam of light reflects off an inner surface of anisotropic block 140c, passes through interface 140a, and is transmitted to the wavelength filter 100 and second quarter waveplate 120 via an internal surface of anisotropic block 140b. The second beam of light, which is designed to correspond to the predetermined wavelength reflected by the wavelength filter 100, is reflected light by the wavelength filter 100 and is directed back through the second quarter waveplate 120, wherein its polarisation is rotated a total of 90° (i.e., to "|"). The reflected beam of light is reflected off the internal surface of anisotropic block 140b, is reflected off interface 140a, and is directed through the second polarisation switch 220, which is in an "ON" state. Accordingly, the added beam of lights exits through output port 180 having the same predetermined polarisation, "•". Notably, in the add/drop mode of operation illustrated in FIGS. 1c and 1d, polarisation switches 150, 160, 170, and 180 are configured to work in cooperation with each other to ensure that the predetermined wavelength is added and dropped appropriately.

Turning now to FIG. 2a–2d there is shown a preferred embodiment of an add/drop device in accordance with the instant invention. The add/drop device 10 is similar to the add/drop device illustrated in FIGS. 1a–1d, however, in this embodiment the wavelength filter 100 is a wavelength selective element for passing a predetermined wavelength and reflecting a plurality of other wavelengths (e.g., a transmissive filter). Furthermore, the positions of the output port 180 and the second polarisation switch 220 are switched with the positions of the drop port 170 and the fourth polarisation switch 190. The device includes a third quarter waveplate 310 and reflective surface 300 are coupled to anisotropic block 130c. Notably, the anisotropic block 130a has a trapezoidal cross section as opposed to the parallelogram shape shown in FIGS. 1a–d.

Figure 2A:
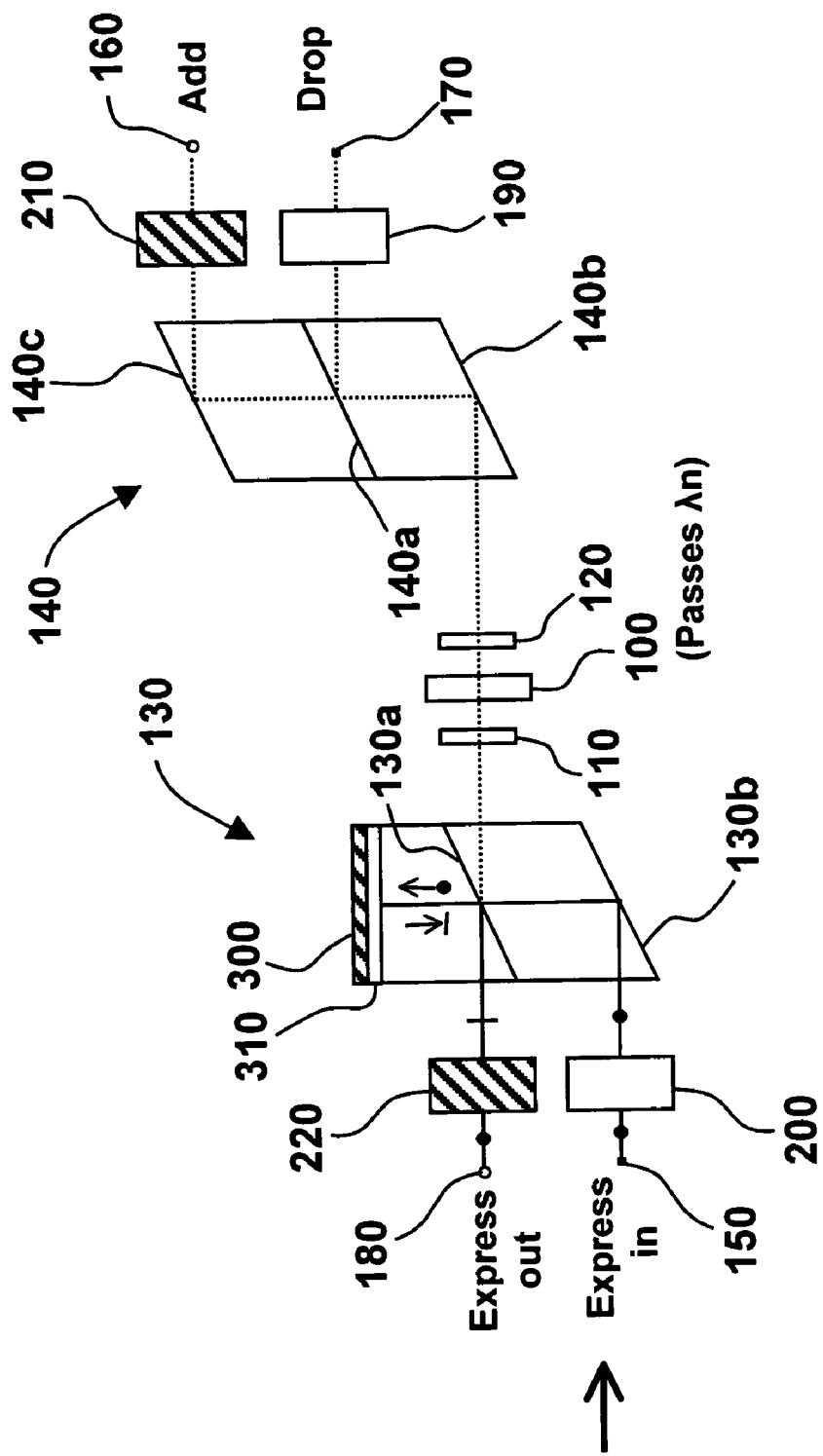
FIGS. 2a and 2b are schematic illustrations showing the express passthrough mode of operation of an add/drop device in accordance with another embodiment of the invention.
Figure 2B:
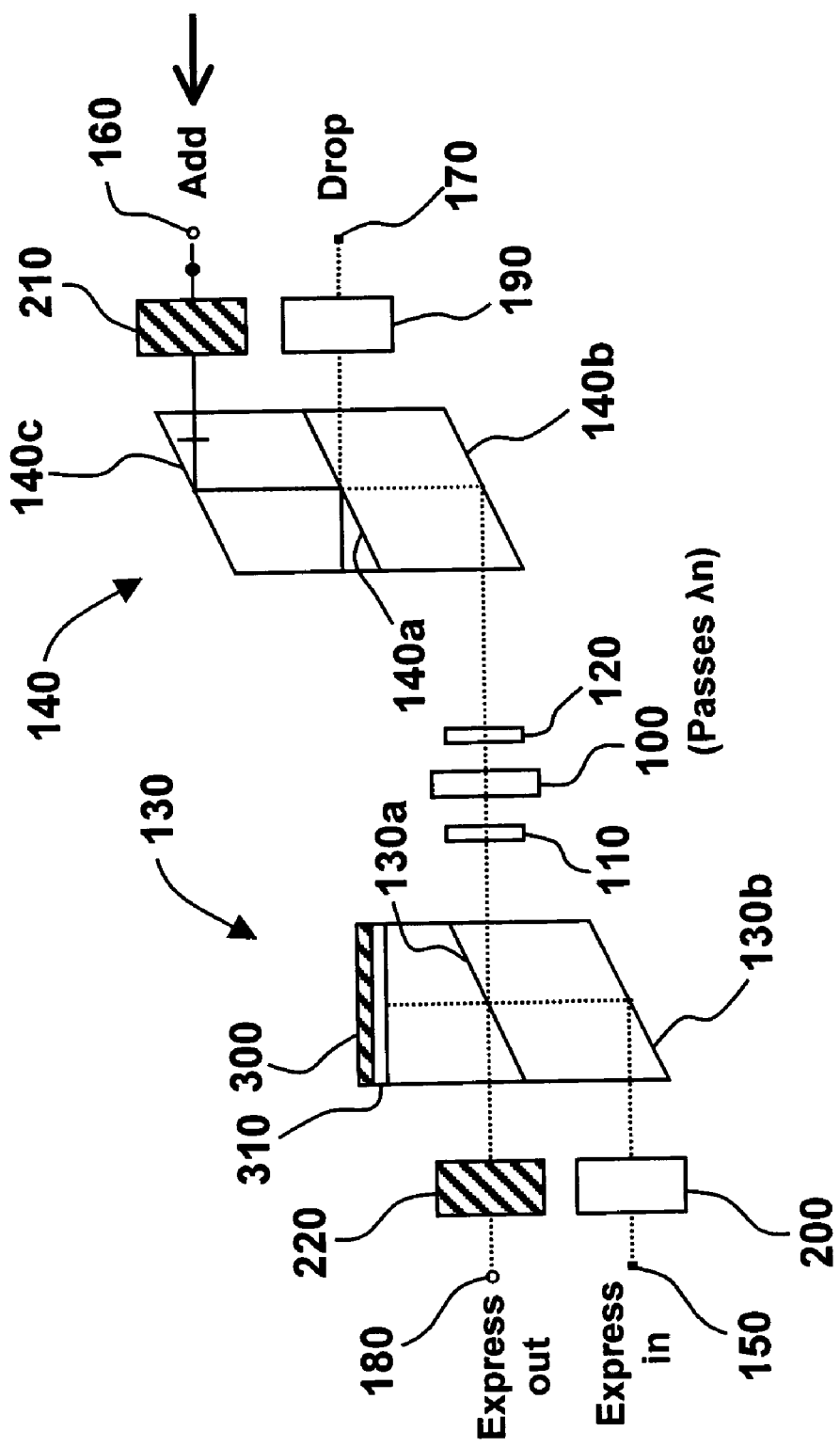

FIGS. 2a and 2b illustrate the express passthrough mode of operation. Referring to FIG. 2a, a beam of light having a predetermined polarisation, "•", is launched from the input port 150 to the first polarisation switch 200, which is in an "OFF" state. Since the polarisation state is not affected by the polarisation switch 200 the beam of light reflects off an inner surface of anisotropic block 130b, passes through the interface 130a, is passed through quarter waveplate 310, and is reflected back to the quarter waveplate 310 via the reflective surface 300. The double pass through the quarter waveplate 310 effectively rotates the polarisation a total of 90° (i.e., from horizontal "•" to vertical "|") such that the beam of light is reflected off interface 130a to the second polarisation switch 220, which is in an "ON" state. Accordingly, the beam of lights exits through output port 180 having the same predetermined polarisation, "•", as launched into port 150.

Referring to FIG. 2b, a second beam of light having a predetermined polarisation, "•",is simultaneously launched from the add port 160 to a third polarisation switch 210, which is in an "ON" state. The polarisation of the second beam of light is rotated by 90° by the polarisation switch 210. Accordingly, the second beam of light reflects off an inner surface of anisotropic block 140c, reflects off interface 140a, and is not collected. Notably, the add/drop device of the instant embodiment has a bypass 2×2 configuration wherein the express optical signal is directed to the output port and the add signal is not collected in the express passthrough mode of operation illustrated in FIGS. 2a and 2b.

Figure 2C:
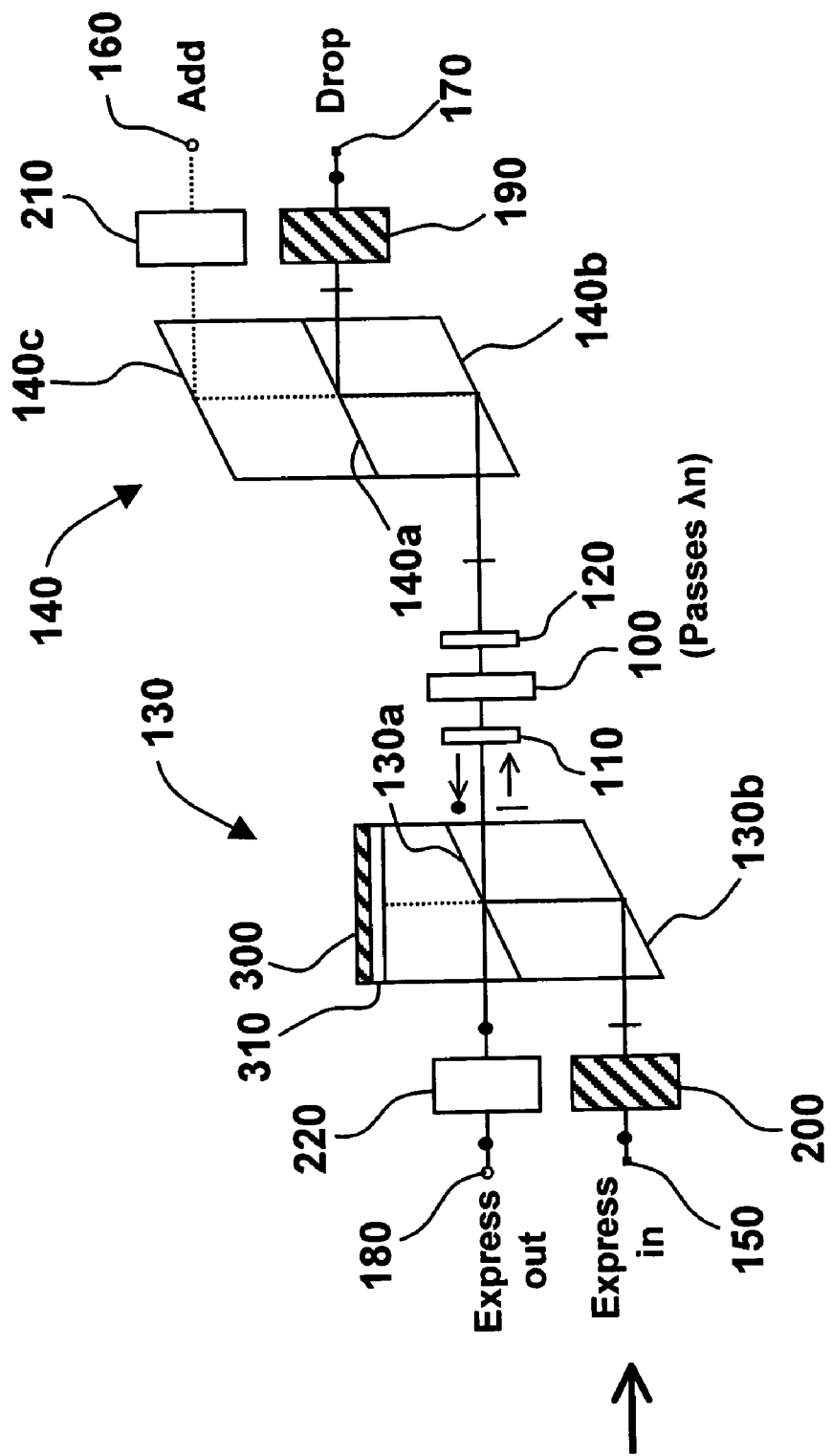
FIGS. 2c and 2d are schematic illustrations showing the add/drop mode of operation of the add/drop device shown in FIGS. 2a and 2b.
Figure 2D:
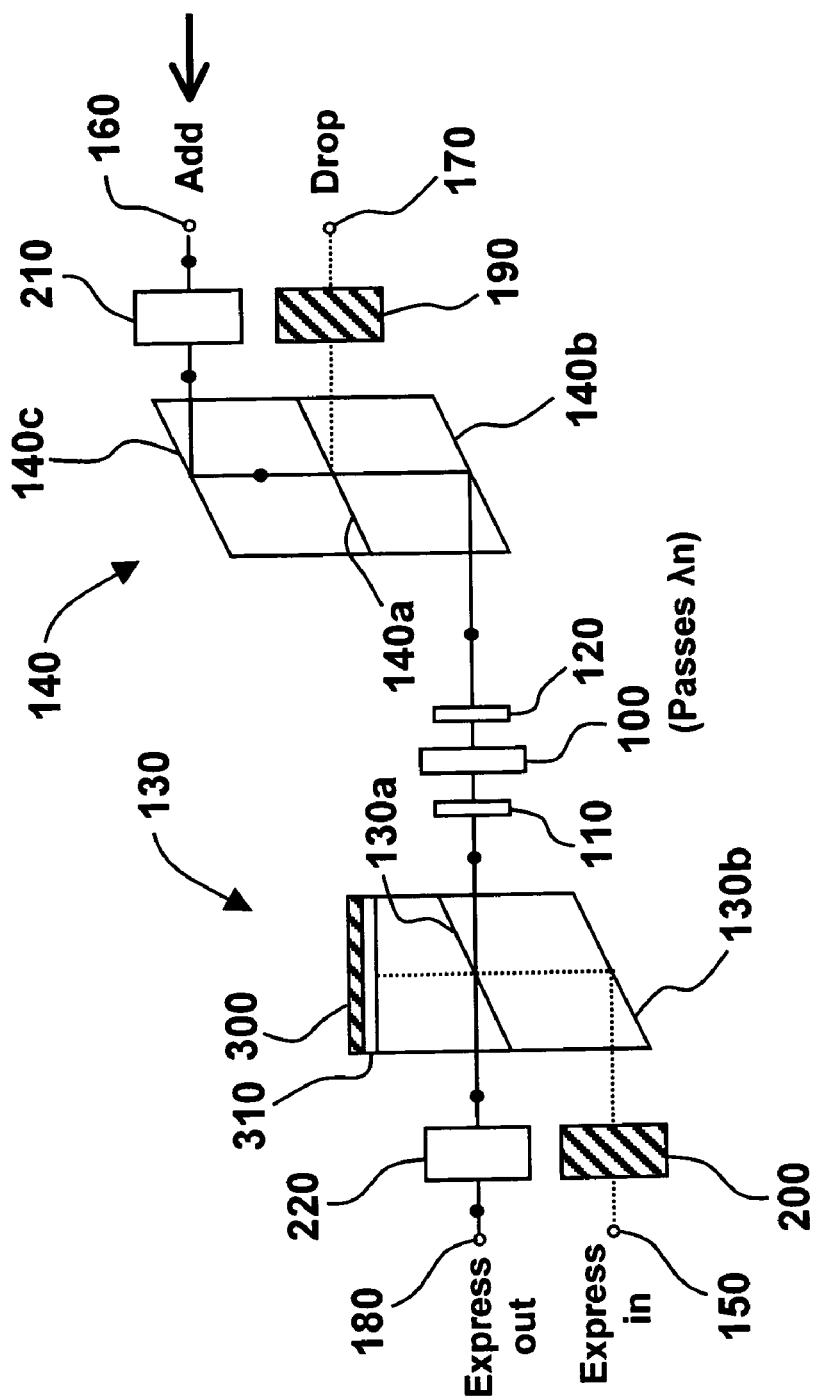

FIGS. 2c and 2d illustrate the add/drop mode of operation. Referring to FIG. 2c, a beam of light having a predetermined polarisation, "•", is launched from the input port 150 to the first polarisation switch 200, which is in an "ON" state. Since the polarisation of the beam of light is rotated by 90° (i.e., to "|") by the polarisation switch 200, the beam of light reflects off an inner surface of anisotropic block 130b, reflects off interface 130a, and is directed to the second polarising beamsplitter 140 via the wavelength filter 100 and quarter waveplates 110 and 120. More specifically, the beam of light is transmitted through the first quarter waveplate 110, wherein the light become circularly polarised, and is transmitted to the wavelength filter 100, which passes a predetermined wavelength and reflects a plurality of other wavelengths. The beam of light corresponding to the plurality of other wavelengths is reflected back through the first quarter waveplate 110 having its polarisation rotated a total of 90° (i.e., to "•"), where it is directed through the interface 130 a to the second polarisation switch 220 in an "OFF" state. The light corresponding to the predetermined wavelength is transmitted through the wavelength filter 100 and second quarter waveplate 120. Since the quarter waveplates 110 and 120 have their optical axes aligned at 90° to one another, the beam of light is incident on the second polarising beamsplitter 140 with a vertical polarisation "|". Accordingly, the transmitted beam of light corresponding to the predetermined wavelength is reflected off inner surface 140b, is reflected off interface 140a, is passed through the fourth polarisation switch 190, which is in an "ON" state, and exits through the drop output port 170 having the predetermined polarisation, "•".

Referring to FIG. 2d, a second beam of light having a predetermined polarisation, "•" and including the predetermined wavelength is simultaneously launched from the add port 160 to the third polarisation switch 210, which is in an "OFF" state. Since the polarisation is not affected by the polarisation switch 210, the beam of light reflects off an inner surface of anisotropic block 140c, passes through interface 140a, and is transmitted to the wavelength filter 100 and second quarter waveplate 120 via an internal surface of anisotropic block 140b. The second beam of light, which is designed to correspond to the predetermined wavelength passed by the wavelength filter 100, is transmitted through the wavelength filter 100 and first quarter waveplate 110. Since the quarter waveplates 110 and 120 have their optical axes aligned at 90° with one another, the beam of light is incident on the second polarising beamsplitter 140 with the predetermined polarisation "•". The beam of light passes through interface 140a and is transmitted to the second polarisation switch 220, which is in an "OFF" state. Accordingly, the added beam of lights exits through output port 220 having the same predetermined polarisation,"•".

Turning now to FIG. 3a–3d there is shown an add/drop device in accordance with yet another embodiment of the invention. The add/drop device 10 is similar to the add/drop device illustrated in FIGS. 2a–2d, however, this embodiment differs in that the positions of the drop port 170 and fourth polarisation switch 190 are exchanged with the positions of the add port 160 and the third polarisation switch 210, respectively. Moreover, the polarisation rotators 110 and 120, are quarter waveplates having their optical axes parallel to one another such that a beam of light having a predetermined polarisation passes sequentially therethrough to emerge with an orthogonal polarisation state. The instant embodiment further differs from the one shown in FIGS. 2a–2b, in that the third quarter waveplate 310, the reflective surface 300, and a fourth quarter waveplate 320 are disposed between the first 130 and second 140 polarising beamsplitters in an optical path parallel to the optical path including the wavelength filter 100. In the instant embodiment, the reflective surface 300 is in the form of a mirror.

Figure 3A:
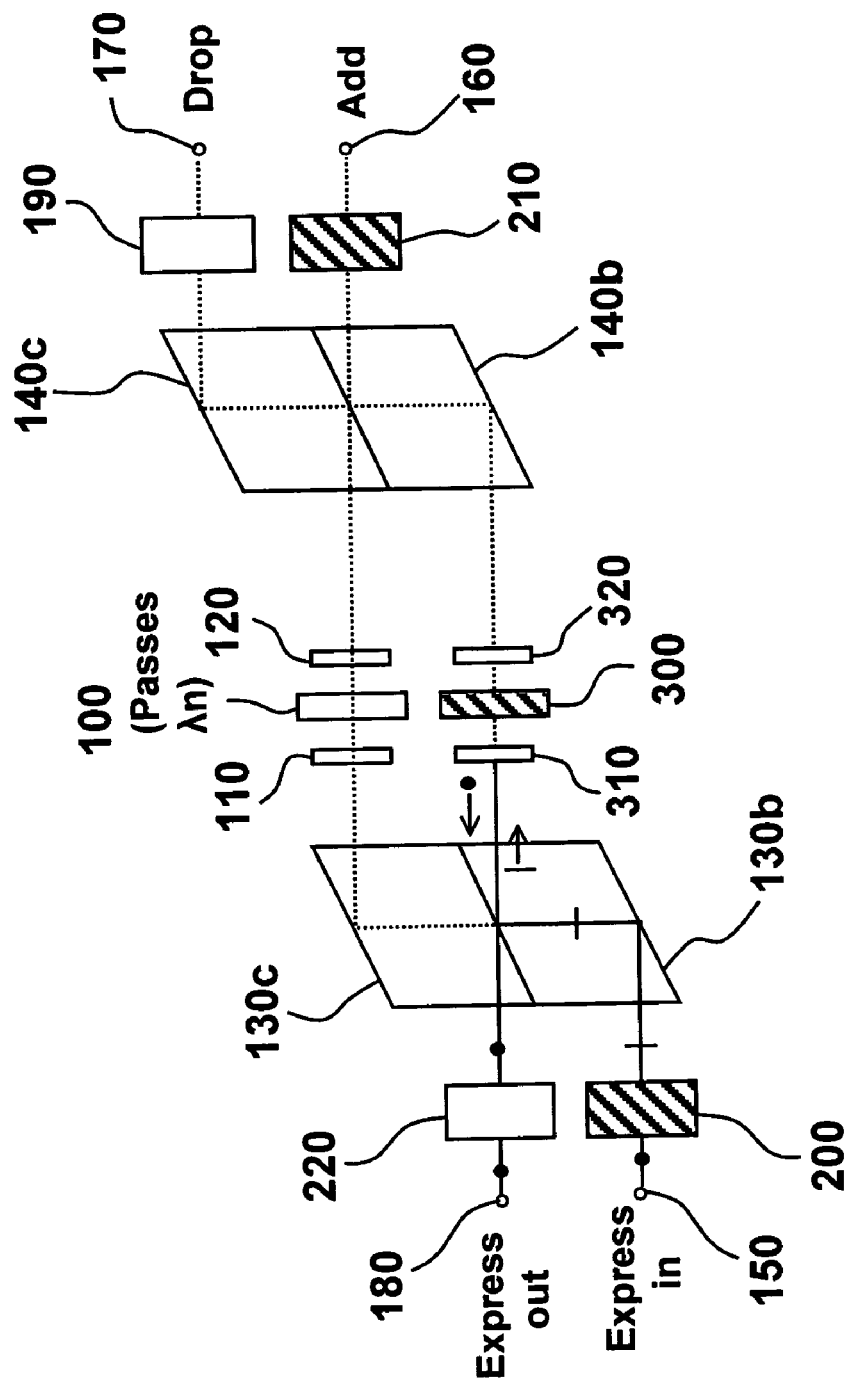
FIGS. 3a and 3b are schematic illustrations showing the express passthrough mode of operation of an add/drop device in accordance with yet another embodiment of the invention.
Figure 3B:
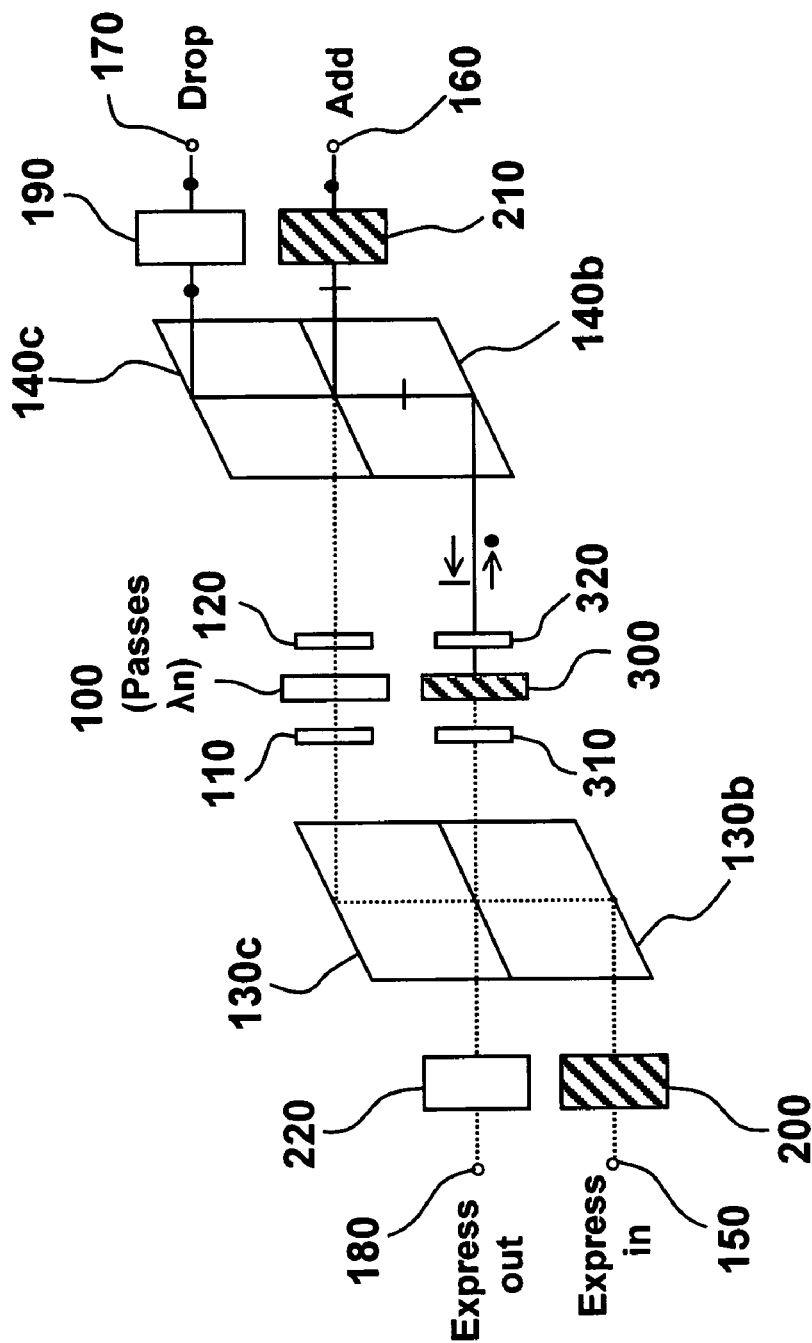

FIGS. 3a and 3b illustrate the express passthrough mode of operation. Referring to FIG. 3a, a beam of light having a predetermined polarisation, "•", is launched from the input port 150 to the first polarisation switch 200, which is in an "ON" state. Since the polarisation is rotated by 90° by the polarisation switch 200, the beam of light reflects off an inner surface of anisotropic block 130b, is reflected off of the interface 130a, is passed through quarter waveplate 310, and is reflected back to the quarter waveplate 310 via the mirror 300. The double pass through the quarter waveplate 310 effectively rotates the polarisation a total of 90° from horizontal "•" to vertical "|") such that the beam of light is transmitted through interface 130a to the second polarisation switch 220, which is in an "OFF" state. Accordingly, the beam of lights exits through output port 180 having the same predetermined polarisation, "•", as launched into port 150.

Referring to FIG. 3b, a second beam of light having a predetermined polarisation, "•",is simultaneously launched from the add port 160 to a third polarisation switch 210, which is in an "ON" state. The polarisation of the second beam of light is rotated by 90° by the polarisation switch 210. Accordingly, the second beam of light reflects off an inner surface reflects off interface 140a, reflects off inner surface of anisotropic block 140c, passes through fourth quarter waveplate 320 and is transmitted to the mirror. The reflected beam of light passes through the fourth quarter waveplate for a second time, such that its polarisation is rotated a total of 90°. The beam of light reflects off the inner surface of anisotropic block 140b, is transmitted through the interface 140a, and is directed to the fourth polarisation switch 190 in an "OFF" state. The beam of light exits through drop port 170 having the same predetermined polarisation, "•", as launched into port 150. Notably, the add/drop device of the instant embodiment has a 2×2 configuration wherein the express optical signal is directed to the output port and the add signal is directed to a drop port in the express passthrough mode of operation illustrated in FIGS. 3a and 3b.

Figure 3C:
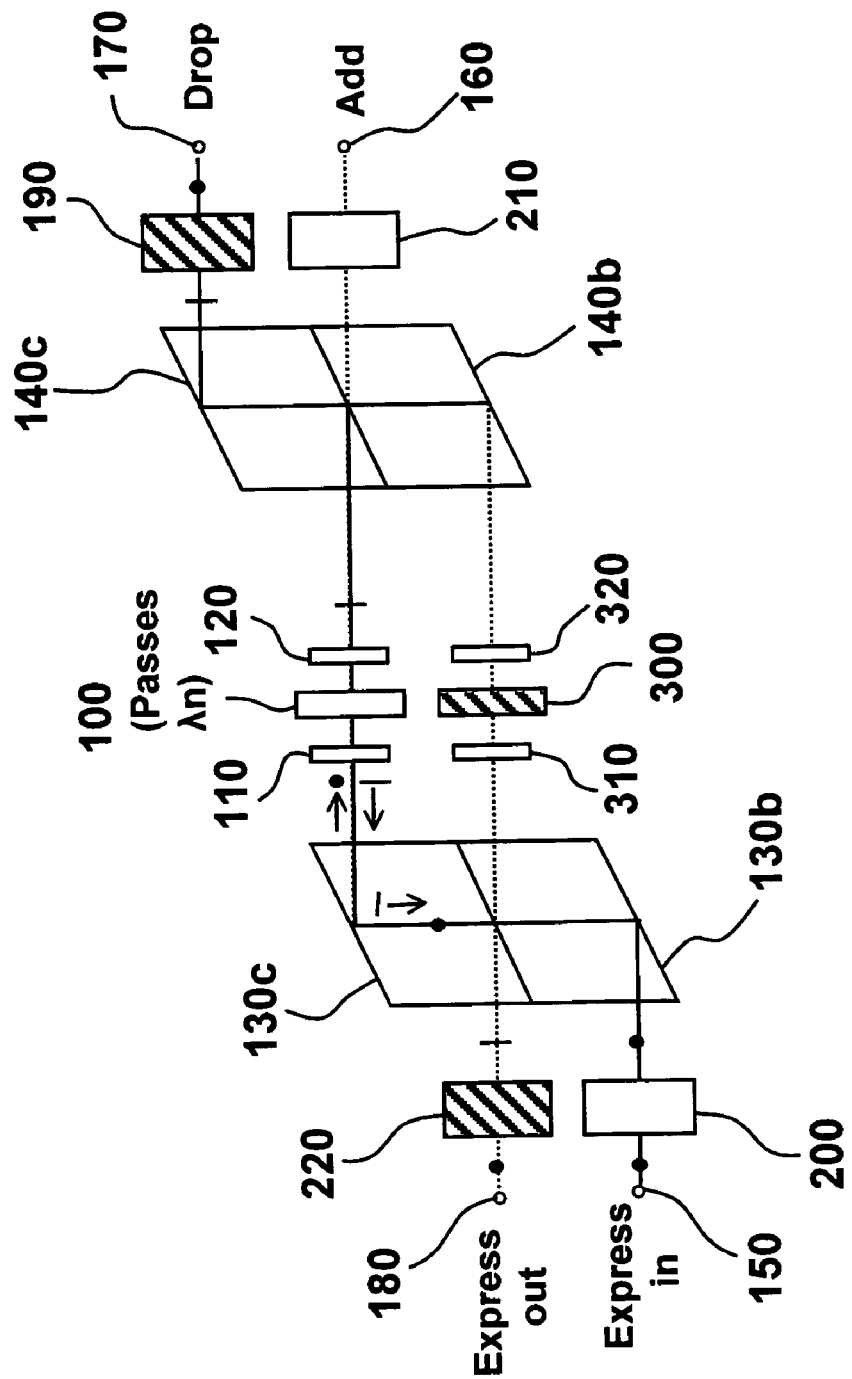
FIGS. 3c and 3d are schematic illustrations showing the add/drop mode of operation of the add/drop device shown in FIGS. 3a and 3b.
Figure 3D:
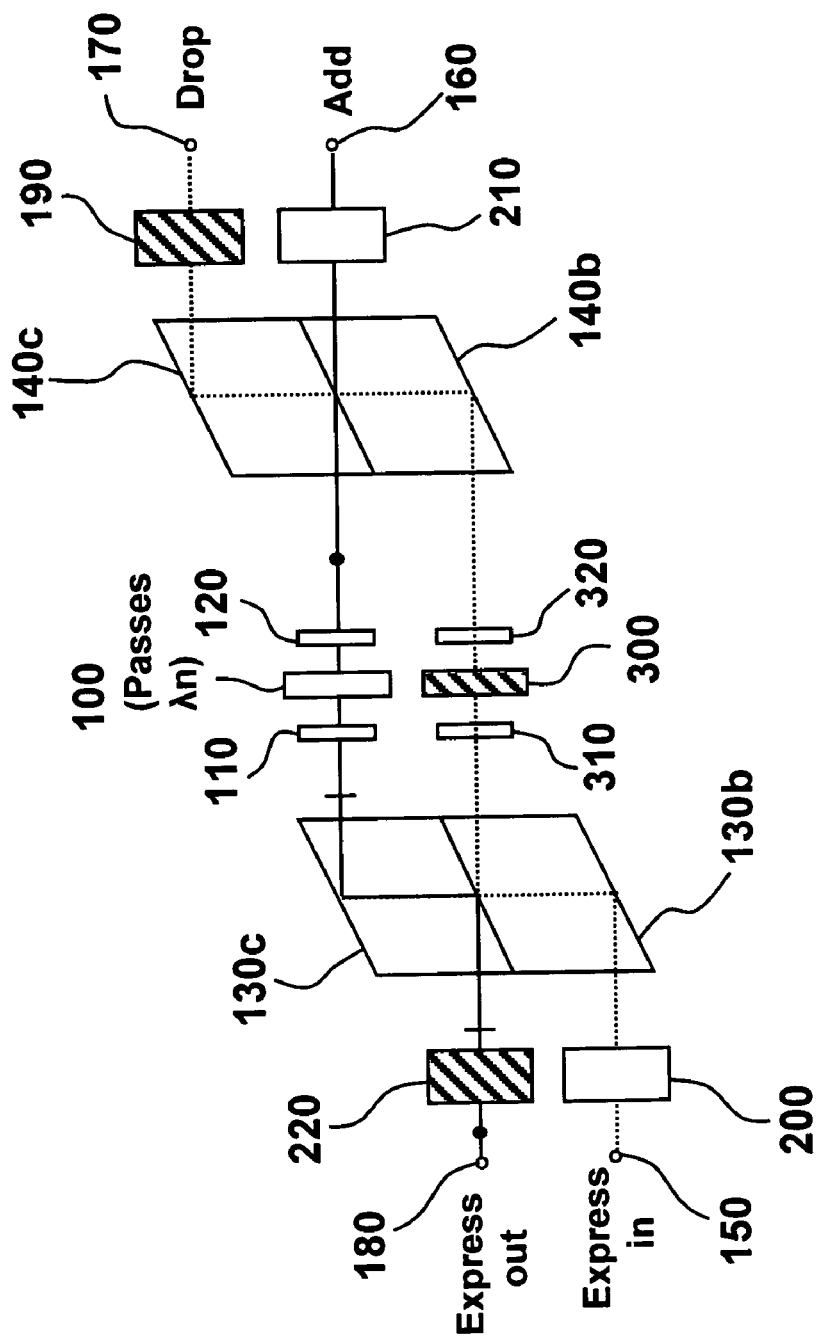

FIGS. 3c and 3d illustrate the add/drop mode of operation. Referring to FIG. 3c, a beam of light having a predetermined polarisation, "•", is launched from the input port 150 to the first polarisation switch 200, which is in an "OFF" state. Since the polarisation state of the beam of light is not affected by the polarisation switch 200, the beam of light reflects off an inner surface of anisotropic block 130b, is transmitted through interface 130a, and is directed to the second polarising beamsplitter 140 via the wavelength filter 100 and quarter waveplates 110 and 120. More specifically, the beam of light is transmitted through the first quarter waveplate 110, wherein the light become circularly polarised, and is transmitted to the wavelength filter 100, which passes a predetermined wavelength and reflects a plurality of other wavelengths. The beam of light corresponding to the plurality of other wavelengths is reflected back through the first quarter waveplate 110 having its polarisation rotated a total of 90° (i.e., to "|"), where it is directed by the interface 130a to the second polarisation switch 220 in an "ON" state. The light corresponding to the predetermined wavelength is transmitted through the wavelength filter 100 and second quarter waveplate 120. Since the quarter waveplates 110 and 120 have their optical axes aligned with one another, the beam of light is incident on the second polarising beamsplitter 140 with a vertical polarisation "|". Accordingly, the transmitted beam of light corresponding to the predetermined wavelength is reflected off inner surface 140b, is reflected off interface 140a, is passed through the fourth polarisation switch 190, which is in an "ON" state, and exits through output port 170 having the predetermined polarisation, "•".

Referring to FIG. 3d, a second beam of light having a predetermined polarisation, "•" and including the predetermined wavelength is simultaneously launched from the add port 160 to the third polarisation switch 210, which is in an "OFF" state. Since the polarisation is not affected by the polarisation switch 210, the beam of light passes through interface 140a and is transmitted to the wavelength filter 100 and second quarter waveplate 120. The second beam of light, which is designed to correspond to the predetermined wavelength passed by the wavelength filter 100, is transmitted through the wavelength filter 100 and first quarter waveplate 110. Since the quarter waveplates 110 and 120 have their optical axes aligned with one another, the polarisation of the beam of light is rotated by 90°. The beam of light is reflected from inner surface 130c, is reflected off from interface 140a, and is transmitted to the second polarisation switch 220, which is in an "ON" state. Accordingly, the added beam of lights exits through output port 220 having the same predetermined polarisation,"•".

Figure 4A:
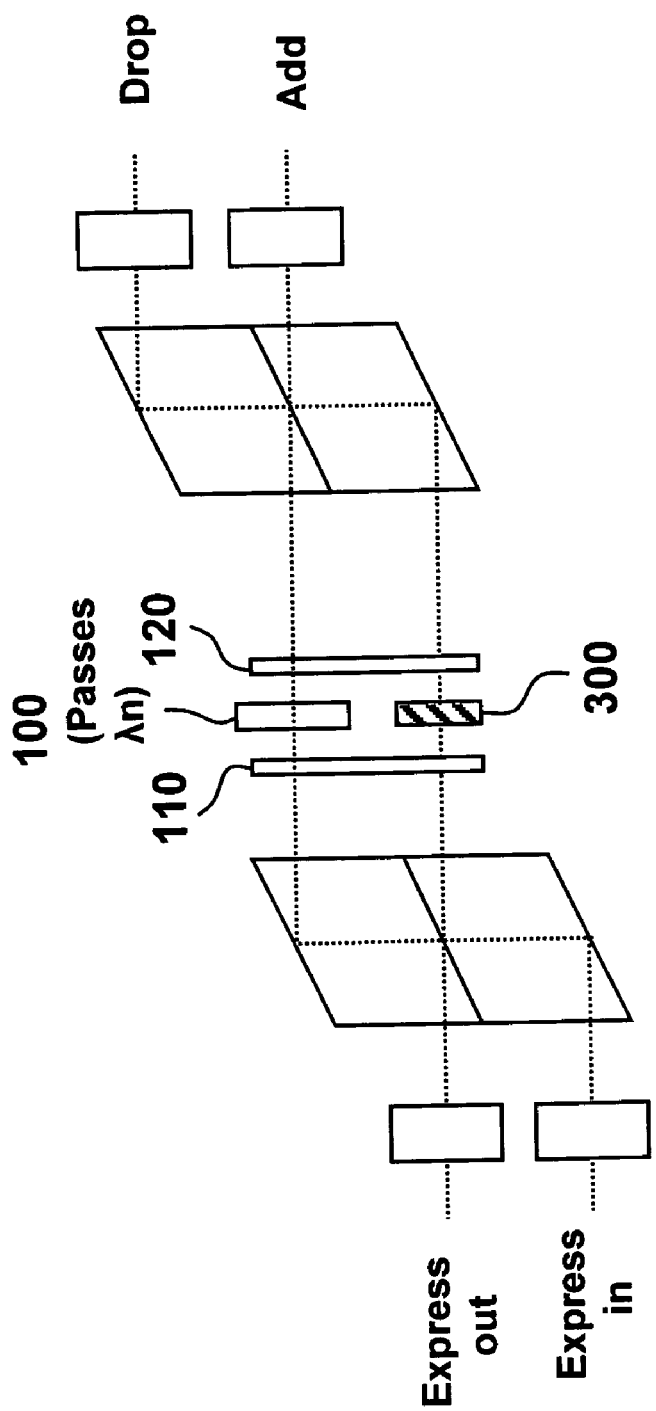
FIGS. 4a and 4b are schematic illustrations showing alternate arrangements of the add/drop device shown in FIGS. 3a–3d.
Figure 4B:
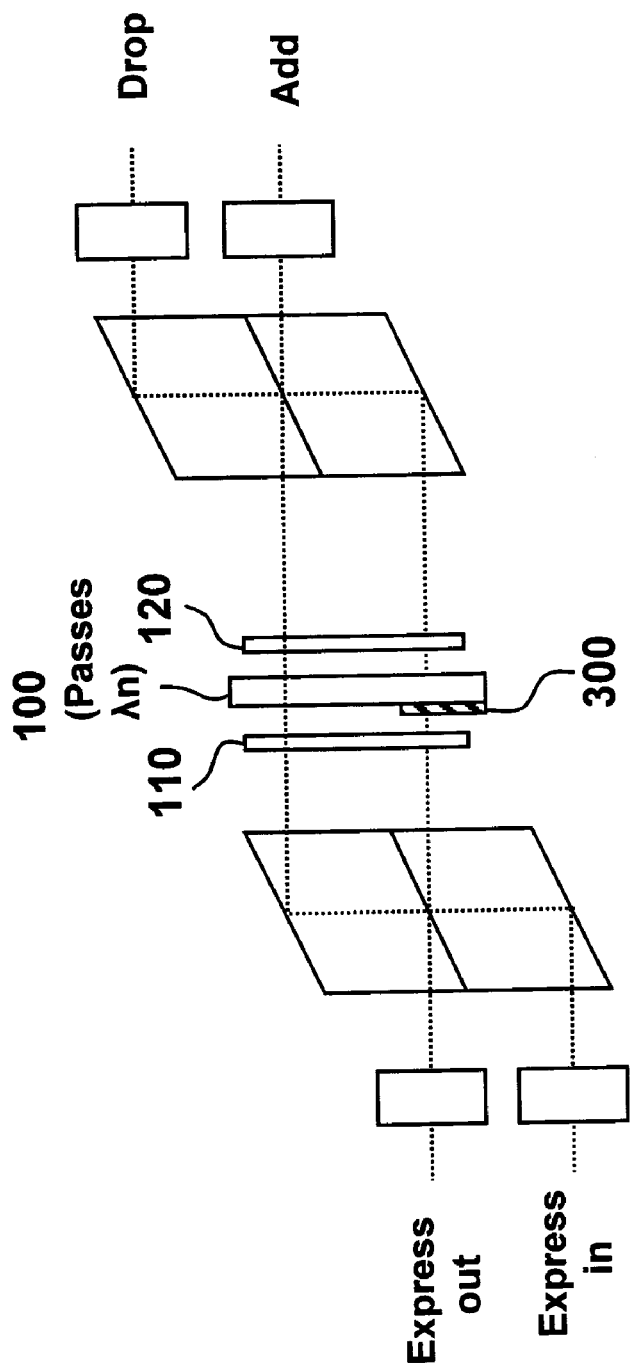

Turning now to FIGS. 4a and 4b, there is shown alternate arrangements of the embodiment shown in FIGS. 3a–3d. In FIG. 4a, the first 110 and second 120 quarter waveplates are designed to encompass both parallel beam paths to replace the function of third 310 and fourth 320 quarter waveplates shown in FIGS. 3a–3d. In FIG. 4b, the wavelength filter designed to encompass both parallel beam paths and is coated with a reflective surface 300 to replace the function of the mirror shown in FIG. 4a. The operation of the alternatives shown in FIGS. 4a and 4b is similar to that discussed for FIGS. 3a–3d.

Figure 5:
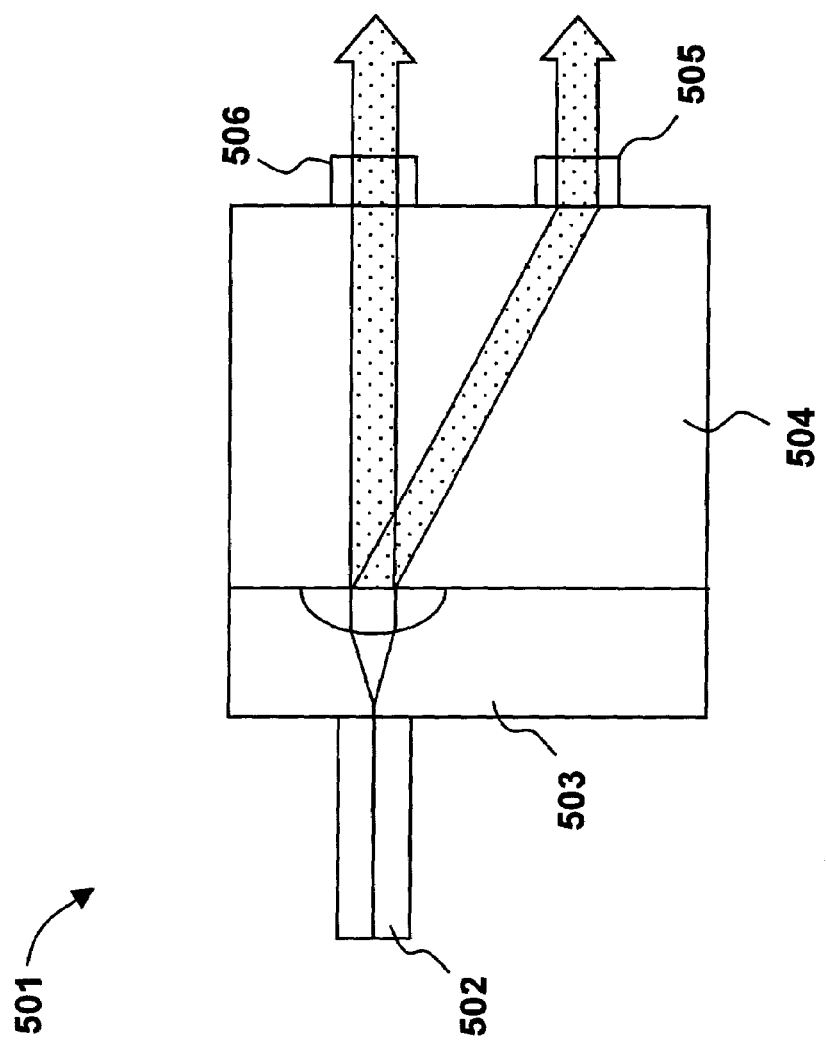
FIG. 5 is a schematic illustration of a micro-optic component for providing polarisation having a predetermined polarisation.

In each of the embodiments described heretofore, the input port 150 and add port 160 are for launching a beam a light having a predetermined polarisation state (e.g., horizontal), and the output port 180 and the drop port 170 are for receiving a beam of light having another predetermined polarisation state (e.g., horizontal). In a preferred embodiment, a front-end micro-optical component 501 is optically coupled to each input port 150,160 to provide the beam of light having a known polarisation state. Referring to FIG. 5, the front-end unit 501 includes a fibre tube 502 for supporting an input optical fibre, a lens 503 such as a GRIN lens or a microlens for collimating an input beam of light, and a birefringent element 504 (e.g., 45°,45° cut $YVO_4$) for separating the collimated input beam into two orthogonal polarised sub-beams. At an output end, a half waveplate 505 is provided to rotate the polarisation of one of the beams by 90° so as to ensure both sub-beam have a same polarisation state e.g., horizontal. Optionally, a second quarter waveplate or glass spacer 506 is provided in accordance with polarisation diversity arrangements known to those skilled in the art. In the same preferred embodiment, a same or similar micro-optical component 501 is optically coupled to the output port for combining the two sub-beams of light. An example of this preferred embodiment is shown in FIGS. 6a–6d, wherein a front-end unit similar to the one shown in FIG. 5 is coupled to each input port 150, 160 and output port 170, 180, of the add/drop device illustrated in FIGS. 2a–2d.

Referring to FIGS. 6a–6d, the orientation of the birefringent element 504 and the position of the half waveplate 505 are selected for combining two sub-beams of light having a predetermined polarisation state and to reduce effects induced by the difference in optical path length along the two diverging paths of birefringent element 504 and the presence of the half waveplate 505 in the micro-optic unit. Notably, the description and operation of the add/drop device shown in FIGS. 6a–6d, is the same as the description and operation of the add/drop device shown in FIGS. 2a–2d with the exception of the inclusion of the front end units 206, 207, 208, and 205.

Figure 6A:
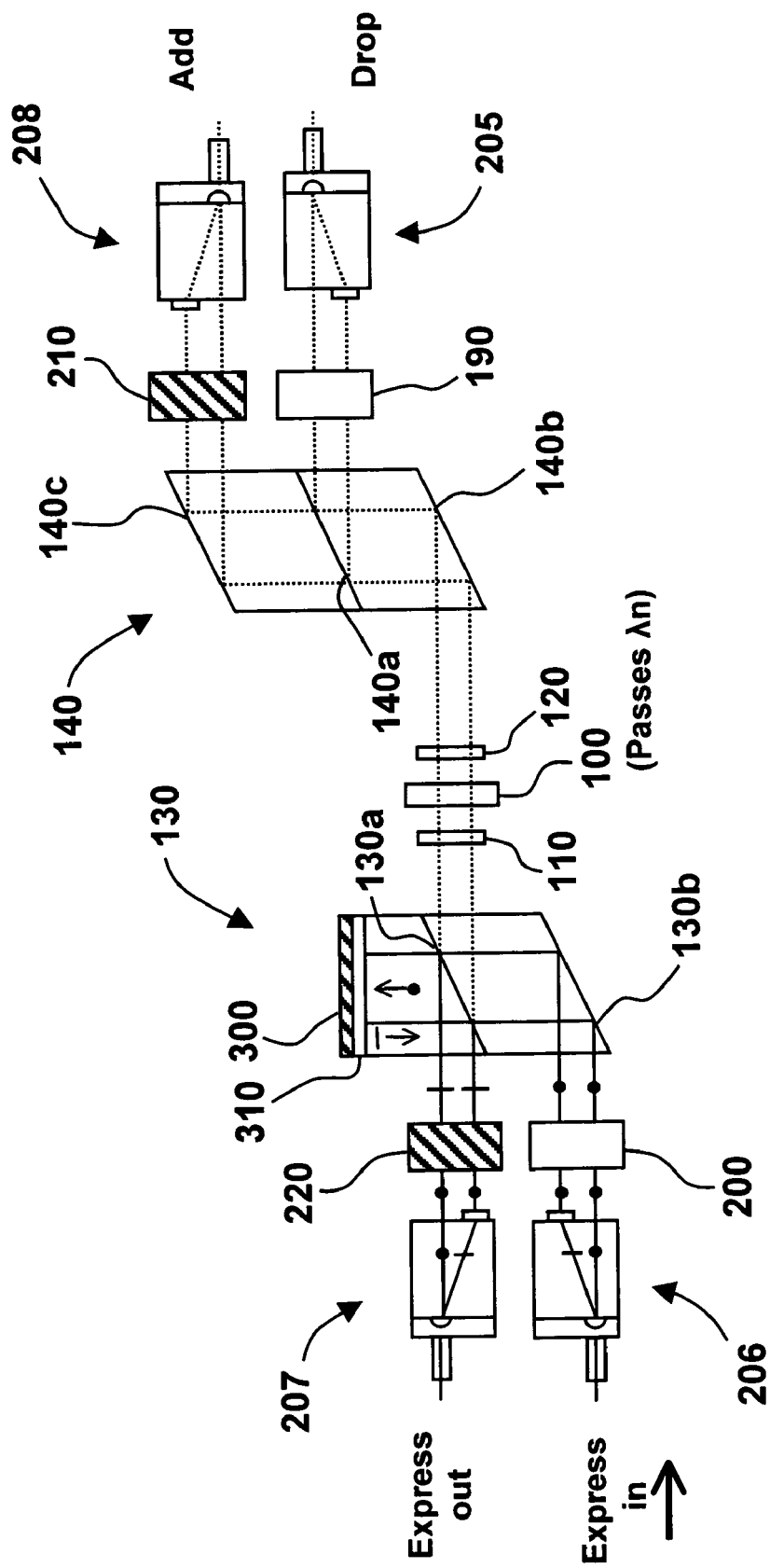
FIGS. 6a–6d are schematic illustrations of the add/drop device shown in FIGS. 2a–2d including a front-end unit similar to the one shown in FIG. 5 coupled to each input port.
Figure 6B:
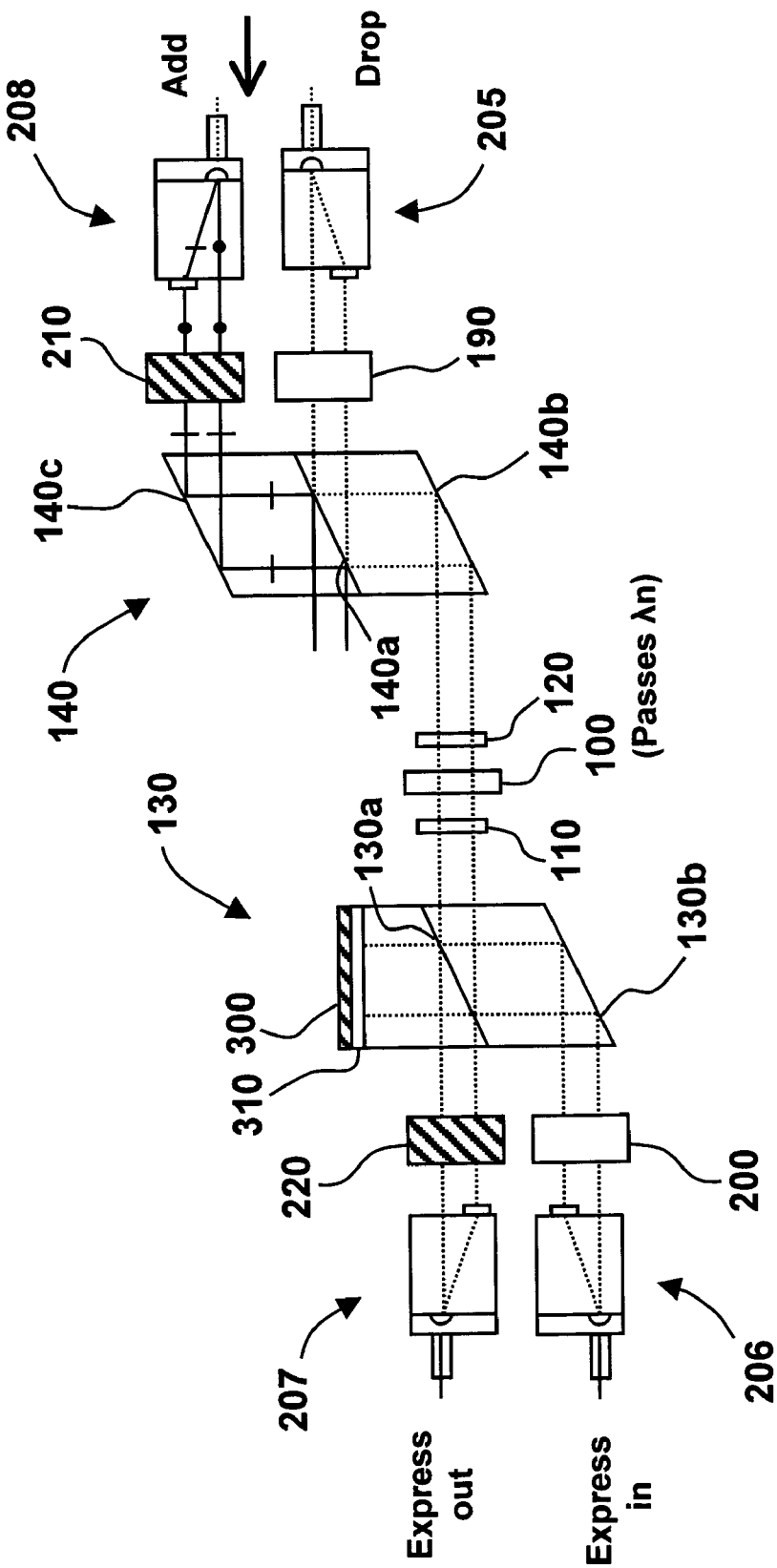
Figure 6C:
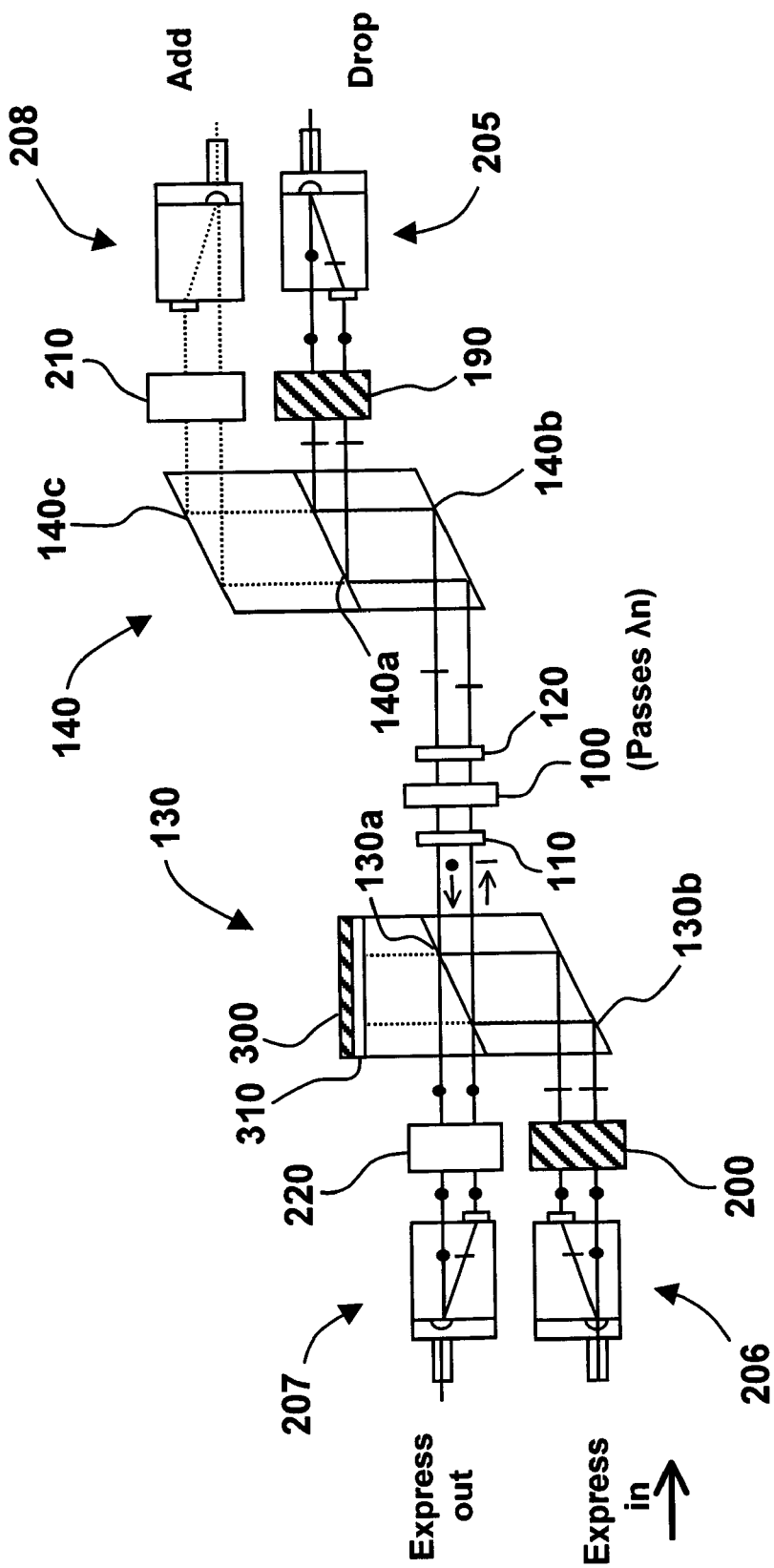
Figure 6D:
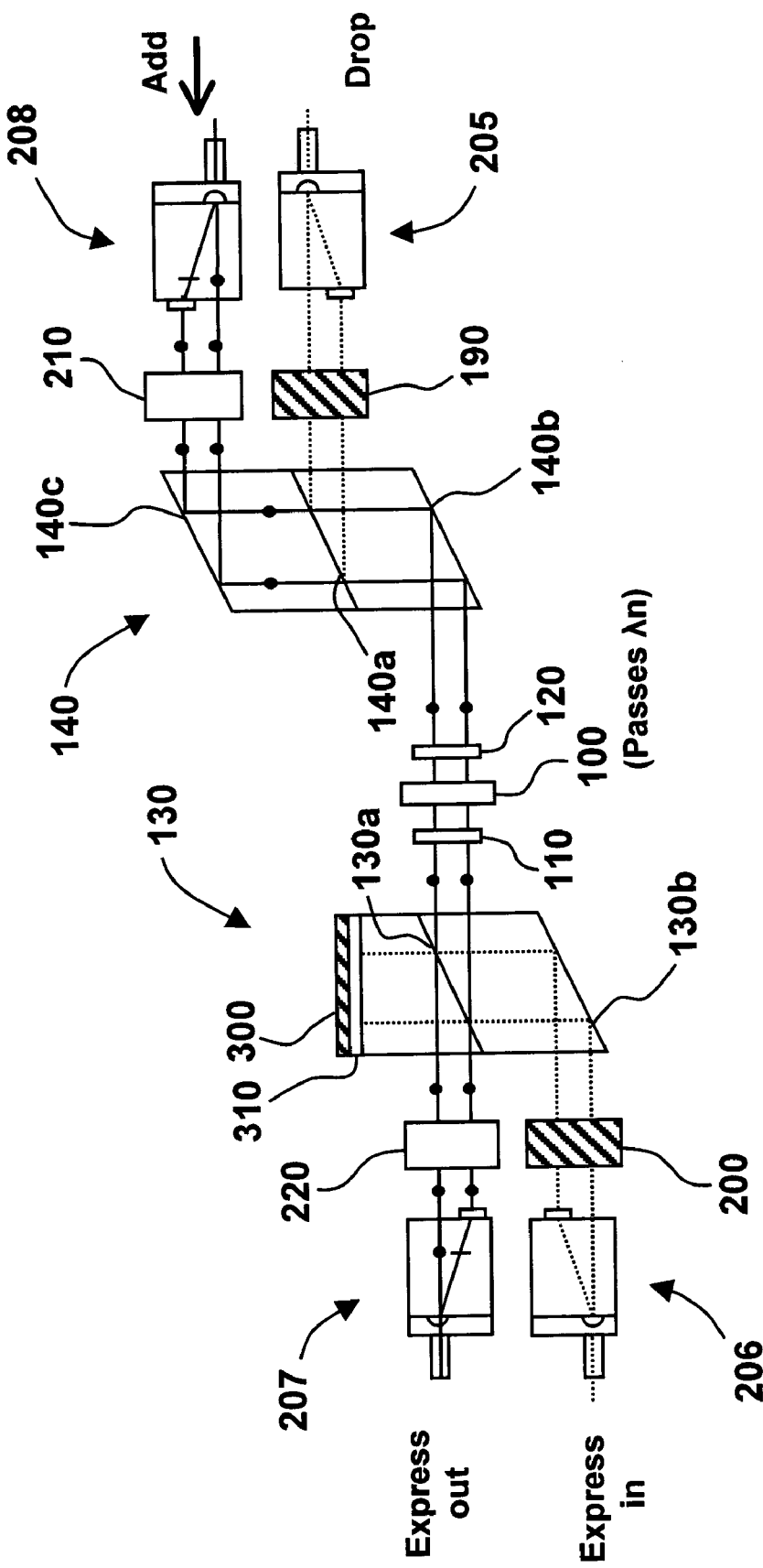

FIGS. 6a and 6b illustrate the express passthrough mode of operation of the device. Referring to FIG. 6a, non-polarised light is launched from an optical fibre to an input of micro-optic unit 206. The non-polarised light is separated into two orthogonal sub-beams of light. The quarter waveplate at the output of the micro-optic units rotates the polarisation of one of the beams to ensure that both sub-beams have the same polarisation. In the express passthrough mode of operation each sub-beam passes through the add/drop device as described above with reference to FIGS. 2a–2b. At the express output, the two sub-beams are recombined via micro-optic unit 207. In the add/drop mode of operation each sub-beam passes through the add/drop device as described above with reference to FIGS. 2c–2d. At the drop output, two sub-beams corresponding to the drop channel are recombined via micro-optic unit 205, while the two sub-beams corresponding to the remaining express channels are recombined via micro-optic unit 207. Similarly, a non-polarised beam of light is launched from a second optical fibre to an input of micro-optic unit 208, wherein the non-polarised light is separated into two orthogonal sub-beams of light and the quarter waveplate at the output of the micro-optic optic units rotates the polarisation of one of the beams to ensure that both sub-beams have the same polarisation. In the express passthrough mode of operation each sub-beam of light corresponding to added channel passes through the add/drop device as described above with reference to FIGS. 2a–2b to be combined with each other and the two subbeams corresponding to the remaining channels, at the express output via micro-optic unit 207.

Figure 7A:
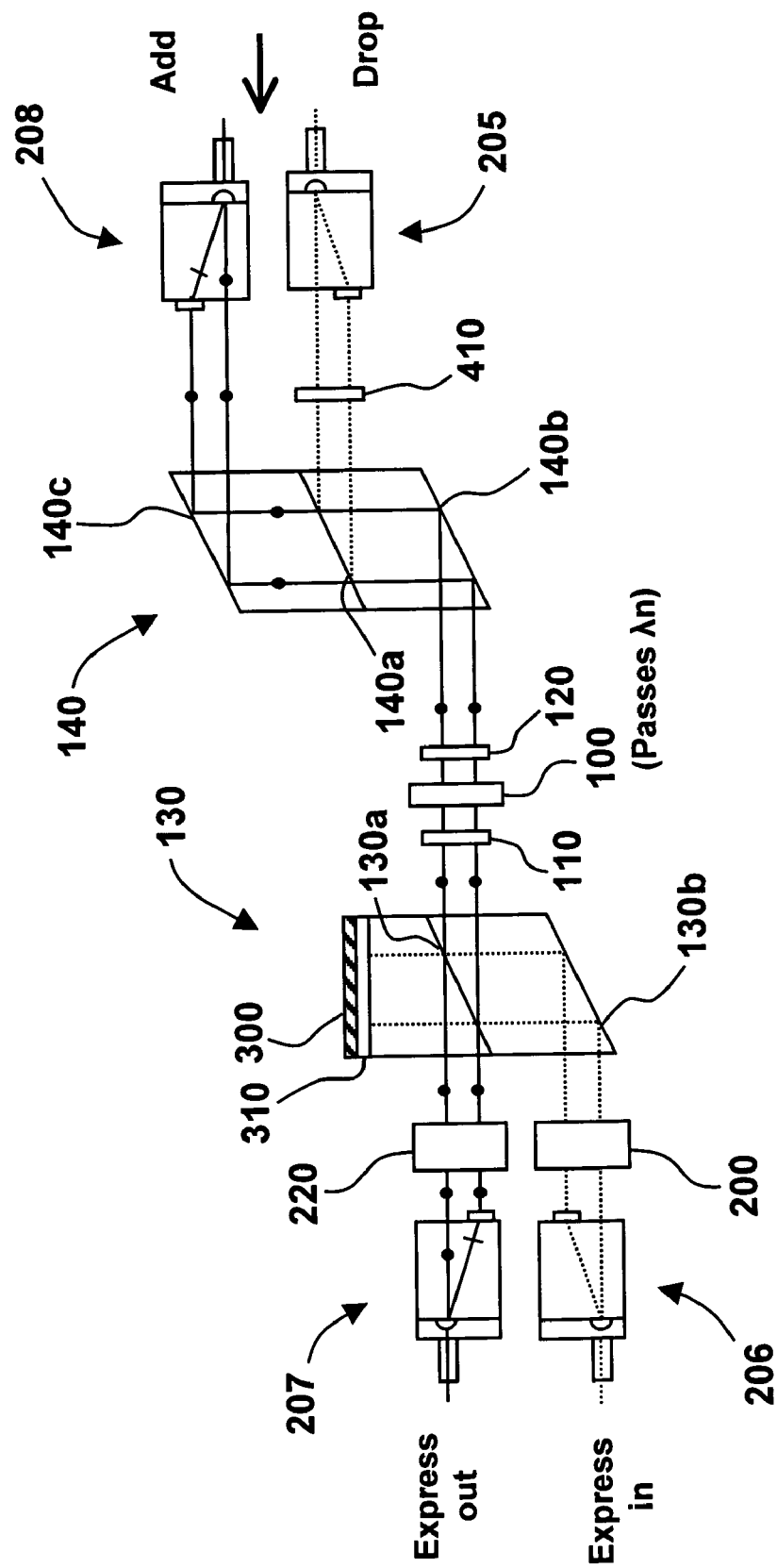
FIGS. 7a and 7b are schematic illustrations of an alternate arrangement of the device shown FIGS. 6a–6d.
Figure 7B:
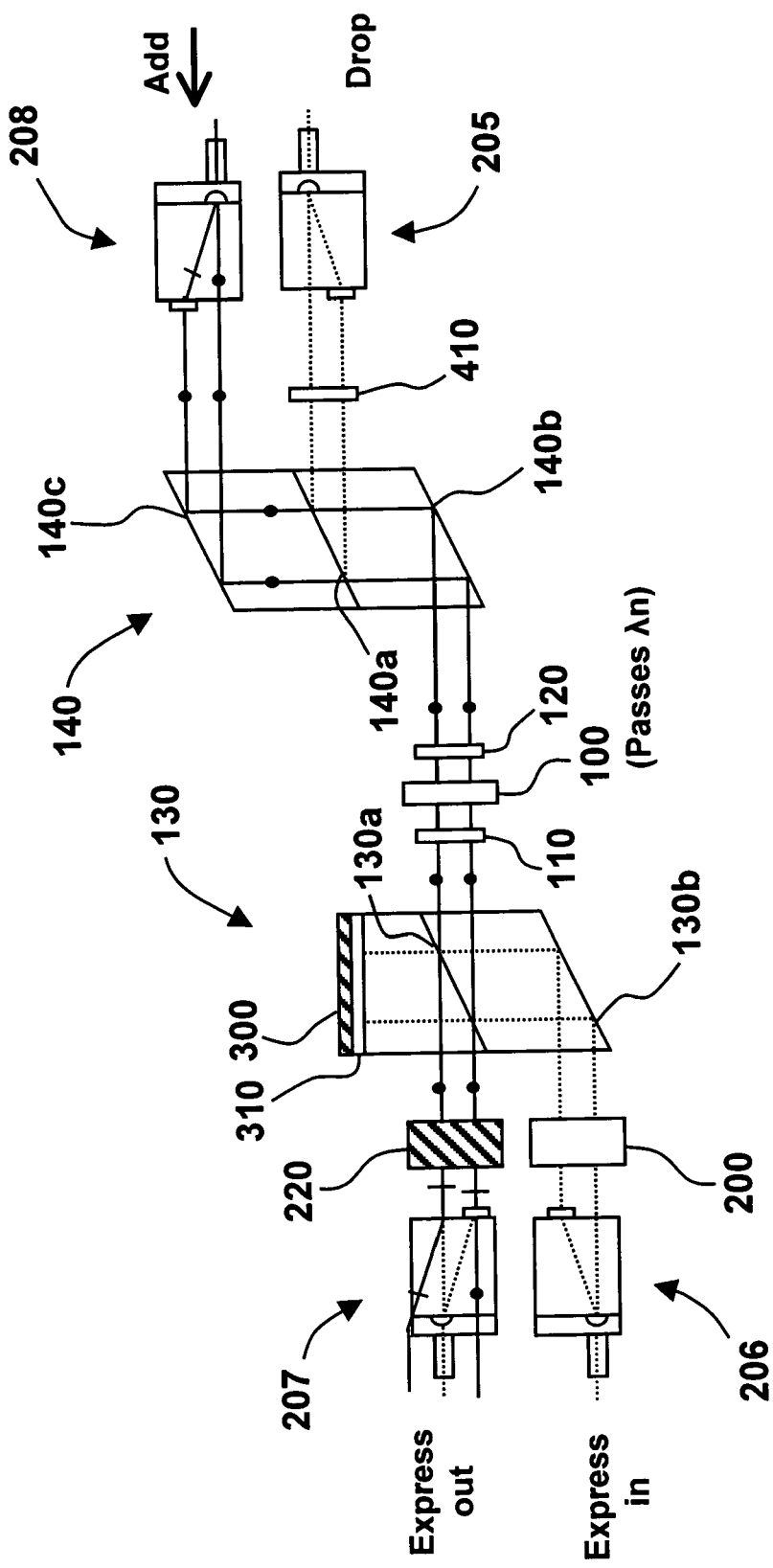

Advantageously, the micro-optic units 205,206,207,208 provide both means for providing light having a predetermined polarisation (e.g., horizontal or vertical) and means for only collecting light having a predetermined polarisation (e.g. vertical or horizontal). For example, consider the optical configurations shown in FIGS. 7a and 7b. Even if light having a predetermined polarisation is continuously launched from the add input, the light corresponding to the added channel will only be collected by output optical fibre 209 if the second polarisation switch 220 is in an "OFF" state as shown in FIG. 7a. Notably, when the second polarisation switch 220 is in an "ON" state, as shown in FIG. 7b, the two sub-beams launched into the micro-optic unit is directed away from the fibre 209. Since the add/drop mode of operation is characterised by the second polarisation switch 220 being in an "OFF" state, the two sub-beams corresponding to the added channel are only collected in this mode of operation. Accordingly, the add/drop device in accordance with the instant invention is operable with only two polarisation switches 200,220 and a half waveplate 410 optically coupled to the drop output.

Figure 8A:
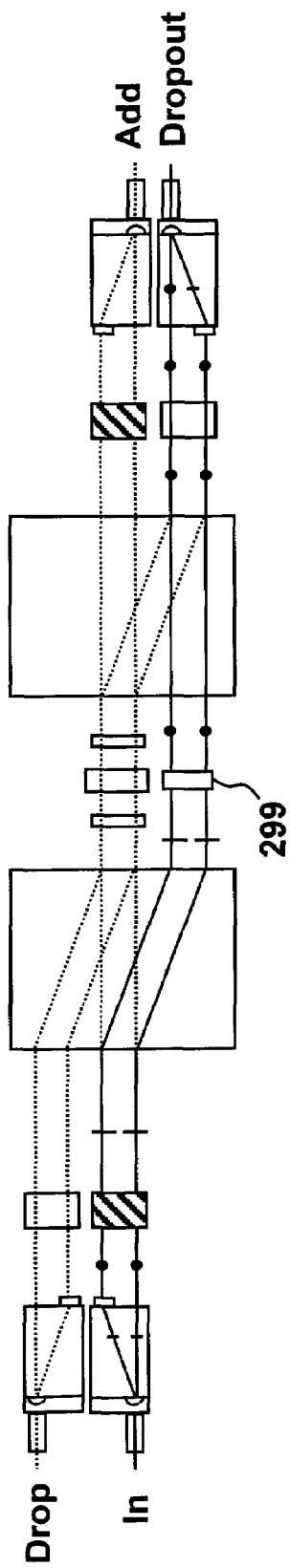
FIGS. 8a and 8b are schematic illustrations showing the express passthrough mode of operation of an add/drop device in accordance with yet another embodiment of the invention.
Figure 8B:
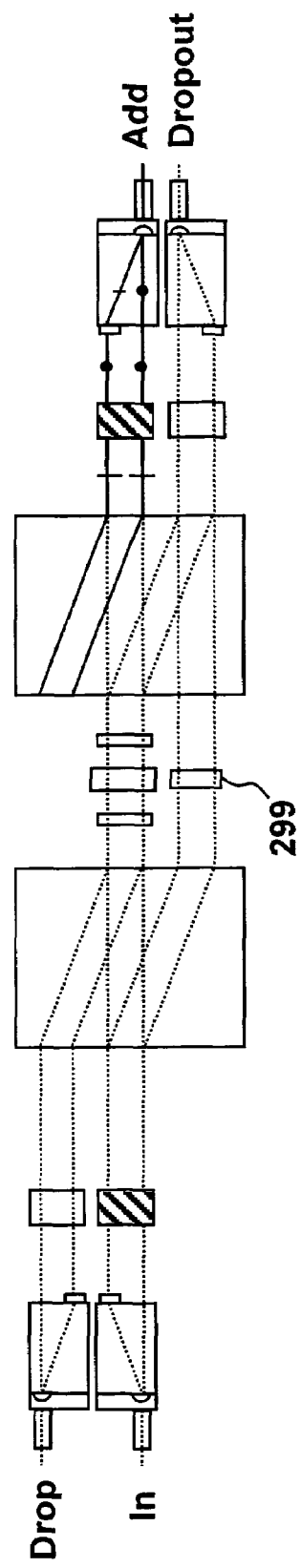

Although it is preferred that the polarising beamsplitters be any one of the conventional polarising beamsplitters having an interface 130a between two cemented anisotropic crystal blocks having different orientations, other polarising beamsplitter are also possible. FIGS. 8a and 8b illustrate the express passthrough mode of operation of a such a device, and FIGS. 8c and 8d illustrate the add/drop mode of operation, when the device includes a conventional walk-off crystal as the polarising beamsplitter.

Preferably, the add/drop devices discussed heretofore have relatively symmetrical arrangements of the wavelength filter sandwiched between two polarising beamsplitters.

However, although it is preferred that the wavelength filter 100 be disposed centrally between the polarizing beamsplitter 130 and 140, the distance between the two polarization beamsplitters is advantageously variable between different fixed configurations. This is in contrast to prior art configurable add/drop devices, wherein the wavelength filter must be precisely and accurately aligned within the device, a troublesome complication when the wavelength filter must be moved in and out of the optical path for providing configurability between add/drop and express modes of operation. Accordingly, the instant invention is well suited to being reconfigurable in that it supports replacing the single wavelength filter with a tunable filter or a mechanism for providing a plurality of filters having different wavelength selectivity (e.g., supported on a daisy wheel). In fact, the long optical path possible between the first and second polarising beamsplitters advantageously increases flexibility in optical design. For example, if the add/drop device is designed to drop and monitor $\lambda_n$, but the source for $\lambda_n$ fails, the instant design is easily reconfigured to drop and monitor $\lambda_p$ instead, by appropriately switching the wavelength filter during the express passthrough mode of operation, thus not interfering with the regular transmission.

Advantageously, the instant invention provides an add/drop device wherein the switching mechanism between express passthough and add/drop modes of operation involves non-moving parts. Accordingly, the instant invention provides a rugged, durable, and reliable add/drop multiplexer.

Numerous other embodiments can be envisaged without departing from the spirit and scope of the invention. For example, the wavelength filter is not limited to notch or narrow bandpass filters, but also encompasses other filters such as cut-off filters.

What is claimed is:

1. An add/drop device comprising:
   first and second optically coupled polarising beamsplitters;
   a wavelength filter disposed between the first and second polarising beamsplitters;
   first and second polarisation rotators disposed between the filter and the first polarising beamsplitter and the filter and the second polarising beamsplitter, respectively;
   first and second input ports optically coupled to the first and second polarising beamsplitters, respectively, each of the first and second input ports for launching a beam of light having a predetermined polarisation;
   first and second output ports optically coupled to the first and second polarising beamsplitters, respectively; and
   first and second polarisation switches optically coupled to the first input port and one of the first and second output ports, respectively, each of the first and second switches for selectably rotating the polarisation of a beam of light launched therethrough and configured to work in cooperation with the other.

2. An add/drop device as defined in claim 1, wherein the first polarisation switch is operable in a first mode of operation that allows at least a portion of a beam of light launched from the first input port to be directed to one of the first and second output ports via the filter, and a second mode of operation that allows at least a portion of the beam of light to be directed to the other of the first and second output ports bypassing the filter.

3. An add/drop device as defined in claim 2, wherein the first and second polarisation switches are configured to be in one of a same and an opposite mode of operation and to switch between modes of operation synchronously such that a beam of light having a predetermined polarisation launched from the first port reaches the other of the first and second ports with a same polarisation.

4. An add/drop device as defined in claim 2, wherein each of the first and second polarising beamsplitters comprises an interface between two anisotropic crystal blocks with perpendicular optical axes for passing light having a first polarisation and for reflecting light having a second orthogonal polarisation.

5. An add/drop device as defined in claim 4, wherein each of the first and second polarisation rotators are quarter waveplates.

6. An add/drop device as defined in claim 5, wherein the first input and first output ports comprise express input and output ports, respectively, the second input and second output ports comprise add and drop ports, respectively, and the second polarisation switch is optically coupled to the express output port.

7. An add/drop device as defined in claim 6, wherein the express input port and express output port are optically coupled to the first polarising beamsplitter, and wherein the wavelength filter comprises a transmissive filter that passes only a single predetermined channel.

8. An add/drop device as defined in claim 7, wherein the wavelength filter is a multidielectric filter.

9. An add/drop device as defined in claim 8, comprising a third quarter waveplate and a reflective surface disposed between the first and second polarising beamsplitters in parallel with the wavelength filter for directing a beam of light reflected by the interface back to the interface with an orthogonal polarisation.

10. An add/drop device as defined in claim 8, comprising a third quarter waveplate and a reflective surface disposed about an end of one of the two anisotropic crystal blocks for directing a beam of light transmitted by the interface back to the interface with an orthogonal polarisation.

11. An add/drop device as defined in claim 7, comprising third and forth polarisation switches optically coupled to the add and the drop ports, respectively.

12. An add/drop device as defined in claim 6, wherein the express input and output ports are optically coupled to the first and second polarising beamsplitters, respectively, and wherein the wavelength filter comprises a notch filter that reflects only a single predetermined channel.

13. An add/drop device as defined in claim 12, comprising third and forth polarisation switches optically coupled to the add and the drop ports, respectively.

14. An add/drop multiplexer comprising:
   a first and a second polarising beamsplitter;
   a wavelength filter disposed between the first and second polarising beamsplitters;
   a polarisation rotator disposed between each polarising beamsplitter and the filter; an input port for launching a multiplexed beam of light having a predetermined polarisation into the first polarising beamsplitter;
   a first polarisation switch disposed between the input port and the first polarising beamsplitter for selectably rotating the polarisation of the multiplexed beam of light, the first polarisation switch operable in a first mode of operation wherein the polarisation is switched such that the first polarising beamsplitter directs the multiplexed beam of light away from the filter to an output port optically coupled to one of the first and second polarising beamsplitters, and a second mode of operation wherein the polarisation is switched such that the first polarising beamsplitter directs the multiplexed beam of light towards the filter where a portion of the beam of light is directed to a drop port optically coupled to the other of the first and second polarising beamsplitters and a remaining portion is directed to the output port;

an add port for launching an add beam of light having a predetermined polarisation into the second polarising beamsplitter such that it is directed to the output port having a same polarisation as the remaining portion; and, a second polarisation switch optically coupled to the output port for working in cooperation with the first polarisation switch to selectably rotate the polarisation of one of the multiplexed beam of light and a composite beam of light including the remaining portion and the add beam of light.

15. An add/drop device as defined in claim 14, comprising third and forth polarisation switches optically coupled to the add and drop ports, respectively, for working in cooperation with each other to selectably rotate the polarisation of an add beam of light and a dropped beam of light, respectively.

16. An add/drop device as defined in claim 15, wherein each of the first and second polarisation rotators are quarter waveplates.

17. An add/drop device as defined in claim 16, wherein the input port and output port are optically coupled to the first polarising beamsplitter, and wherein the wavelength filter comprises a transmissive filter that passes only a single predetermined channel wavelength band.

18. An add/drop device as defined in claim 17, wherein the wavelength filter is a multidielectric filter.

19. An add/drop device as defined in claim 18, wherein the wavelength filter is removable for replacing with another wavelength filter having a different wavelength selectivity.

20. In a four-port add/drop optical system comprising an input port and an output port for transmitting and receiving a multiplexed beam of light, respectively, an add port and a drop port for transmitting an added and dropped beam of light, respectively, a first and a second polarising beamsplitter, a wavelength filter disposed between the first and second polarising beamsplitters, a polarisation rotator disposed between each polarising beamsplitter and the wavelength filter, and a first and a second polarisation switch optically coupled to the input port and the output port, respectively, a method comprising the steps of:

launching a first beam of light having a known polarisation from the input port to the first polarising beamsplitter;

operating the first polarisation switch in a first mode of operation such that the first polarising beamsplitter directs the first beam of light away from the wavelength filter to the output port;

operating the first polarisation switch in a second mode of operation such that the first polarising beamsplitter directs the first beam of light to the wavelength filter, where a first portion is directed to the drop port and a second portion is directed to the output port;

launching a second beam of light having a known polarisation from the add port to the second polarising beamsplitter;

operating the second polarisation switch in one of the first and second modes of operation synchronously with the first polarisation switch.

21. A method according to claim 20, further comprising the steps of:

synchronously operating third and fourth polarisation switches optically coupled to the add and drop ports in one of the first and second modes of operation such that the second beam of light is only transmitted to the output port when the first polarisation switch is operated in the second mode of operation.

* * * * *